United States Patent

Park

[11] Patent Number: 5,809,474
[45] Date of Patent: Sep. 15, 1998

[54] AUDIO ENCODER ADOPTING HIGH-SPEED ANALYSIS FILTERING ALGORITHM AND AUDIO DECODER ADOPTING HIGH-SPEED SYNTHESIS FILTERING ALGORITHM

[75] Inventor: Sung-hee Park, Iri, Rep. of Korea

[73] Assignee: Samsung Electronics Co., Ltd., Kyungki-do, Rep. of Korea

[21] Appl. No.: 706,144

[22] Filed: Sep. 20, 1996

[30] Foreign Application Priority Data

Sep. 22, 1995 [KR] Rep. of Korea ........................ 95-31752

[51] Int. Cl.[6] ................................ H03M 7/00; G06T 9/00
[52] U.S. Cl. ........................ 704/503; 704/229; 704/230; 704/500
[58] Field of Search ..................................... 704/200, 263, 704/241, 227, 229, 230, 500, 503, 502

[56] References Cited

U.S. PATENT DOCUMENTS

| 5,040,217 | 8/1991 | Brandenburg et al. | 704/263 |
| 5,285,498 | 2/1994 | Johnston | 381/2 |
| 5,481,614 | 1/1996 | Johnston | 704/241 |
| 5,488,665 | 1/1996 | Johnston et al. | 704/263 |
| 5,508,949 | 4/1996 | Konstantinides | 704/200 |
| 5,535,300 | 7/1996 | Hall et al. | 704/227 |

FOREIGN PATENT DOCUMENTS

| 0661827 | 12/1994 | European Pat. Off. | H04B 1/66 |
| 0661827A2 | 7/1995 | European Pat. Off. | H04B 1/66 |

OTHER PUBLICATIONS

IEEE Transactions on Consumer Electronics; Maturi, "Single Chip Audio Decoder", vol. 38, pp. 348–356, Aug. 1992.

IEEE Signal Processing Letters; Konstantinides, "Fast Subband Filtering in MPEG Audio Coding", vol. 1, No. 2, pp. 26–28, Feb. 1994.

Primary Examiner—Richemond Dorvil
Attorney, Agent, or Firm—Leydig, Voit & Mayer, Ltd.

[57] ABSTRACT

An audio encoder/decoder adopting a high-speed analysis filtering algorithm is provided. The audio encoder has a mapping unit for classifying a received audio signal according to a frequency band by using the high-speed band analysis filtering algorithm, a psychoacoustic model for assigning bits to each frequency band using psychoacoustic characteristics, a quantizing and encoding unit for quantizing and encoding the mapped signal according to the number of bits assigned to each frequency band, and a frame packing unit for generating a bit stream from a signal output from said quantizing and encoding unit. The audio decoder has a frame unpacking unit for unpacking a signal from a coded and received bit stream, a decoding and inverse-quantizing unit for decoding and inverse-quantizing said quantized signal, and an inverse-mapping unit for time/frequency-inverse-mapping the inverse-quantized signal by using the high-speed band synthesis filtering algorithm.

6 Claims, 16 Drawing Sheets

C<sub>sum</sub>[128]=(

| | | | |
|---|---|---|---|
| −0.000000000, | −0.000005245, | −0.000005245, | −0.000005245, |
| −0.000005346, | −0.000005723, | −0.000005722, | −0.000006199, |
| −0.000007153, | −0.000007630, | −0.000008106, | −0.000008583, |
| −0.000009537, | −0.000010491, | −0.000011921, | −0.000012898, |
| −0.000013828, | −0.000099182, | −0.000099182, | −0.000100136, |
| −0.0000100613, | −0.000101089, | −0.000102520, | −0.000103476, |
| −0.0000104428, | −0.000105857, | −0.000107288, | −0.000108719, |
| −0.0000110149, | −0.000111580, | −0.000113010, | −0.000113964, |
| 0.0000101566, | 0.000138282, | 0.000134945, | 0.000129699, |
| 0.0000122547, | 0.000113010, | 0.000101566, | 0.000088215, |
| 0.0000072480, | 0.000055313, | 0.000035763, | 0.000014782, |
| −0.00008106, | −0.000032902, | −0.00005904, | −0.000087261, |
| −0.000218868, | −0.001493454, | −0.001490592, | −0.001485348, |
| −0.001478195, | −0.001468658, | −0.001457215, | −0.001442910, |
| −0.001426697, | −0.001407146, | −0.001457215, | −0.001360893, |
| −0.001333236, | −0.001302719, | −0.001385312, | −0.001231193, |
| −0.000971317, | −0.000049114, | −0.001268863, | −0.000099659, |
| −0.000143528, | −0.000199318, | −0.000068187, | −0.000346183, |
| −0.000436783, | −0.000537872, | −0.000267505, | −0.000768661, |
| −0.000897885, | −0.001034736, | −0.000648499, | −0.001329422, |
| −0.002457142, | −0.009261608, | −0.001179218, | −0.009144783, |
| −0.009042740, | −0.008912086, | −0.008751859, | −0.008563518, |
| −0.008345604, | −0.008099556, | −0.007824898, | −0.007522106, |
| −0.007191181, | −0.006832599, | −0.006446362, | −0.006032467, |
| −0.003134727, | −0.009534359, | −0.009600639, | −0.009711266, |
| −0.009864807, | −0.010060788, | −0.010299682, | −0.010579586, |
| −0.010900020, | −0.011259079, | −0.011656285, | −0.012089729, |
| −0.012557984, | −0.013058663, | −0.013591289, | −0.014153003, |
| −0.017876148, | −0.061022785, | −0.060931683, | −0.060781002, |
| −0.060570240, | −0.060299396, | −0.059970856, | −0.059582710, |
| −0.059138298, | −0.058637619, | −0.058081150, | −0.057470799, |
| −0.056807518 | −0.056093216, | −0.055328369, | −0.054515838, |

| | | | |
|---|---|---|---|
| −0.000442505, | −0.000473022, | −0.000534058, | −0.000579834, |
| −0.000625610, | −0.000686646, | −0.000747681, | −0.000808716, |
| −0.000885010, | −0.000961304, | −0.001037598, | −0.001113892, |
| −0.001205444, | −0.001296997, | −0.001388550, | −0.001480103, |
| −0.001586914, | −0.001693726, | −0.001785278, | −0.001907349, |
| −0.002014160, | −0.002120972, | −0.002243042, | −0.002349854, |
| −0.002456665, | −0.002578735, | −0.002685547, | −0.002792358, |
| −0.002899170, | −0.002990723, | −0.003082275, | −0.003173828, |
| −0.007003784, | −0.007919312, | −0.008865356, | −0.009841919, |
| −0.010848999, | −0.011886597, | −0.012939453, | −0.014022827, |
| −0.015121460, | −0.016235352, | −0.017349243, | −0.018463135, |
| −0.019577026, | −0.020690918, | −0.021789551, | −0.022857666, |
| −0.023910522, | −0.024932861, | −0.025909424, | −0.026840210, |
| −0.027725220, | −0.028533930, | −0.029281616, | −0.029937744, |
| −0.030532837, | −0.031005859, | −0.031387329, | −0.031661987, |
| −0.031814575, | −0.031845093, | −0.031738281, | −0.031478882, |
| −0.078628540, | −0.084182739, | −0.089706421, | −0.095169067, |
| −0.100540161, | −0.105819702, | −0.110946655, | −0.115921021, |
| −0.120697021, | −0.125259399, | −0.129562378, | −0.133590698, |
| −0.137298584, | −0.140670776, | −0.143676758, | −0.146255493, |
| −0.148422241, | −0.150115967, | −0.151306152, | −0.151962280, |
| −0.152069092, | −0.151596069, | −0.150497437, | −0.148773193, |
| −0.146362305, | −0.143264771, | −0.139450073, | −0.134887695, |
| −0.129577637, | −0.123474121, | −0.116577148, | −0.108856201, |
| −0.572036743, | −0.600219727, | −0.628295898, | −0.656219482, |
| −0.683914185, | −0.711318970, | −0.738372803, | −0.765029907, |
| −0.791213989, | −0.816864014, | −0.841949463, | −0.866363525, |
| −0.890090942, | −0.913055420, | −0.935195923, | −0.956481934, |
| −0.976852417, | −0.996246338, | −1.014617920, | −1.031936646, |
| −1.048156738, | −1.063217163, | −1.077117920, | −1.089782715, |
| −1.101211548, | −1.111373901, | −1.120223999, | −1.127746582, |
| −1.133926392, | −1.138763428, | −1.142211914, | −1.144287109, |

FIG. 13B

D_sum[128]=(

|              |              |              |              |
|-------------:|-------------:|-------------:|-------------:|
| 0.000000000, | −0.000488281, | −0.000549317, | −0.000595093, |
| −0.000640869, | −0.000701905, | −0.000762940, | −0.000839234, |
| −0.000915528, | −0.000991822, | −0.001068116, | −0.0001159668, |
| −0.001251220, | −0.001358032, | −0.001449585, | −0.001556397, |
| 0.003250122, | −0.001785279, | −0.001892090, | −0.002014161, |
| −0.002136230, | −0.002258301, | −0.002395630, | −0.002517701, |
| −0.002655029, | −0.0027922358, | −0.002929688, | −0.003051757, |
| −0.003189087, | −0.003311158, | −0.003448486, | −0.003570557, |
| −0.007385254, | −0.008407593, | −0.009460449, | −0.010559082, |
| −0.011703491, | −0.012863160, | −0.014068603, | −0.015289307, |
| −0.01652268, | −0.017807007, | −0.019088745, | −0.020370483, |
| 0.031082153, | −0.022994995, | −0.024291992, | −0.025573731, |
| −0.026855469, | −0.028091431, | −0.029312134, | −0.030487060, |
| −0.031631470, | −0.032699585, | −0.033721924, | −0.34667968, |
| −0.035537720, | −0.036331177, | −0.037033081, | −0.037597656, |
| 0.031082153, | −0.053665161, | −0.059921265, | −0.066284179, |
| −0.072738647, | −0.079284668, | −0.085861206, | −0.092498780, |
| −0.099121093, | −0.105728149, | −0.112304688, | −0.118789673, |
| −0.125183105, | −0.131439209, | −0.137542725, | −0.143432617, |
| 0.100311279, | −0.154510498, | −0.159622192, | −0.164382934, |
| −0.168777466, | −0.172775268, | −0.176315308, | −0.179382324, |
| −0.181915284, | −0.183898926, | −0.185287475, | −0.186019897, |
| −0.186111450, | −0.185470581, | −0.184097290, | −0.181915238, |
| 0.100311279, | −0.509292603, | −0.547607421, | −0.586624145, |
| −0.626296998, | −0.666534424, | −0.707290650, | −0.748519897, |
| −0.790145874, | −0.832092285, | −0.874328613, | −0.916717529, |
| −0.959259033, | −1.001831055, | −1.044357300, | −1.086791993, |
| 1.144989014, | −1.171035767, | −1.212677002, | −1.253921509, |
| −1.294662475, | −1.334808350, | −1.374328613, | −1.413101196, |
| −1.451080322, | −1.488174438, | −1.524307251, | −1.559402466, |
| −1.593399048, | −1.626235962, | −1.657821655, | −1.688110351, |

FIG. 13C

D_sub[128]=(

| | | | |
|---|---|---|---|
| −0.000076294, | 0.000457763, | 0.000518799, | 0.000564575, |
| 0.000610351, | 0.000671387, | 0.000732422, | 0.000778198, |
| 0.000854492, | 0.000930786, | 0.001007080, | 0.001068116, |
| 0.001159668, | 0.001235962, | 0.001327515, | 0.001403809, |
| −0.000442505, | 0.001602173, | 0.001678466, | 0.001800537, |
| 0.001892090, | 0.001983643, | 0.002090454, | 0.002182007, |
| 0.002258301, | 0.002365112, | 0.002441406, | 0.002532959, |
| 0.002609253, | 0.002670288, | 0.002716064, | 0.002777099, |
| 0.002227783, | 0.011245728, | 0.012252807, | 0.013275147, |
| 0.014312744, | 0.015365601, | 0.016418457, | 0.017486572, |
| 0.018539429, | 0.019607544, | 0.020629883, | 0.021636963, |
| 0.022628784, | 0.023574829, | 0.024490357, | 0.025344849, |
| −0.007003784, | 0.026870727, | 0.027526856, | 0.028106689, |
| 0.028594971, | 0.028976441, | 0.029251098, | 0.029388428, |
| 0.029434204, | 0.029312133, | 0.029052734, | 0.028656006, |
| 0.028091430, | 0.027359009, | 0.026443481, | 0.025360108, |
| −0.000686646, | 0.114700317, | 0.119491577, | 0.124053955, |
| 0.128341675, | 0.132354736, | 0.136032104, | 0.139343262, |
| 0.142272949, | 0.144790649, | 0.146820068, | 0.148391723, |
| 0.149414063, | 0.149902343, | 0.149810791, | 0.149078369, |
| −0.078628540, | 0.145721436, | 0.142990112, | 0.139541626, |
| 0.135360718, | 0.130416870, | 0.124679566, | 0.118164062, |
| 0.110809326, | 0.102630616, | 0.093612671, | 0.083755493, |
| 0.073043824, | 0.061477661, | 0.049057006, | 0.035797119, |
| −0.152206421, | 0.691146851, | 0.708984375, | 0.725814819, |
| 0.741531372, | 0.756103516, | 0.769454956, | 0.781539917, |
| 0.792282104, | 0.801635743, | 0.809570313, | 0.816009521, |
| 0.820922851, | 0.824279785, | 0.826034546, | 0.826171875, |
| −0.572036743, | 0.821456909, | 0.816558838, | 0.089951783, |
| 0.801651001, | 0.791625976, | 0.779907227, | 0.766464234, |
| 0.751342774, | 0.734573364, | 0.716140747, | 0.696090698, |
| 0.674453736, | 0.651290894, | 0.626602173, | 0.600463867, |

AUDIO ENCODER ADOPTING HIGH-SPEED ANALYSIS FILTERING ALGORITHM AND AUDIO DECODER ADOPTING HIGH-SPEED SYNTHESIS FILTERING ALGORITHM

BACKGROUND OF THE INVENTION

The present invention relates to an audio encoder and decoder, and more particularly, to an audio encoder and decoder adopting high-speed analysis and synthesis filtering algorithms, respectively, in which the number of multiplications required for operations in a standardized filter is reduced utilizing characteristics of a window coefficient.

An international audio coding standard, i.e., IS 11172-3 proposed in the Moving Picture Experts Group (MPEG), provides a high-quality audio playback signal for use in, for example, a compact disk (CD), at 128 Kbps per audio channel. This international standard can be used to store an audio signal in a digital storage medium such as a CD, a digital audio tape (DAT), or a hard disk, and may reconstruct an audio signal by connecting the storage medium to a decoder directly or through other means such as a communication line. Further, a bit stream encoded by an encoder may be directly reconstructed to an audio signal in a decoder through a communication line.

In practically implementing such encoder and decoder in a system, analysis and synthesis filtering algorithms perform the most computations in the whole system. In particular, in an audio decoder, most of the time is consumed in a band synthesis filtering algorithm. Hence, the issue of how to efficiently realize the analysis and synthesis filtering algorithms is closely related to efficiently implementing the audio encoder and decoder.

That is, realization of the audio encoder and decoder in exclusive-use hardware by efficient implementation of the analysis and synthesis filtering algorithms reduces time required for encoding and decoding. Thus, the encoder and decoder may be realized using a slower and cheaper processor available. Further, due to increasing use of multimedia devices along with development of computers, communications, and broadcasting, there is an increase in the need for reconstructing an audio signal by decoding an encoded bit stream using software, rather than exclusive-use hardware. Though improvement of the performance of the multimedia devices increases the probability of real-time processing in a general-purpose processor of high performance, a fast algorithm enables operations of real-time processing software in more general-purpose processors.

However, the algorithm disclosed in the MPEG audio standard coding, i.e., IS 11172-3, simply uses operational equations related to analysis and synthesis filtering algorithm without simplification, thus consuming much time for analysis and synthesis filtering algorithms. To overcome this problem, algorithms relying on high-speed discrete cosine transform (DCT) have been suggested.

Such algorithms perform the same operations as those of the filtering algorithm for the MPEG audio standard coding, i.e., IS 11172-3, whereas mapping cosine values can be performed by a fast DCT algorithm. Most operations were implemented for mapping cosine values in IS 11172-3, while time for mapping cosine values is drastically reduced by using the high-speed DCT in the proposed algorithms. As a result, window-related operations including windowing an input signal and adding polyphase components are increased. However, no decrease in the window-related operations leads to no more decrease in operations.

However, symmetry of MPEG window coefficients can contribute to reduction of window-related operations and storage memory requirements.

SUMMARY OF THE INVENTION

To circumvent the above problems, an object of the present invention is to provide audio encoder and decoder adopting high-speed analysis and synthesis filtering algorithms, respectively, for simplifying filter-definition equations to utilize symmetry of MPEG window coefficients, improving the simplified definition equations to be used in a high-speed DCT algorithm, and thus reducing window-related operations.

To achieve the above object, there is provided an audio encoder adopting a high-speed analysis filter/audio decoder adopting a high-speed synthesis filtering algorithm, wherein the audio encoder comprising: a mapping unit for classifying a received audio signal according to a frequency band by using the high-speed band analysis filter; a psychoacoustic model for assigning bits to each frequency band by using psychoacoustic characteristics; a quantizing and encoding unit for quantizing and encoding the mapped signal according to the number of bits assigned to each frequency band; and a frame packing unit for generating a bit stream from a signal output from the quantizing and encoding unit, and wherein the audio decoder comprising: a frame unpacking unit for unpacking a signal from a coded and received bit stream; a decoding and inverse-quantizing unit for decoding and inverse-quantizing the quantized signal; and an inverse-mapping unit for time/frequency-inverse-mapping the inverse-quantized signal by using the high-speed band synthesis filtering algorithm.

BRIEF DESCRIPTION OF THE DRAWINGS

The above object and advantages of the present invention will become more apparent by describing in detail a preferred embodiment thereof with reference to the attached drawings in which:

FIGS. 12A to 12B illustrate C2[128], Csum[128], and Dsub[128] used in FIG. 10; and FIGS. 13A to 13C illustrate D2[128], Dsum[128], and Dsub[128] used in FIG. 11.

DETAILED DESCRIPTION OF THE INVENTION

Figure 1:
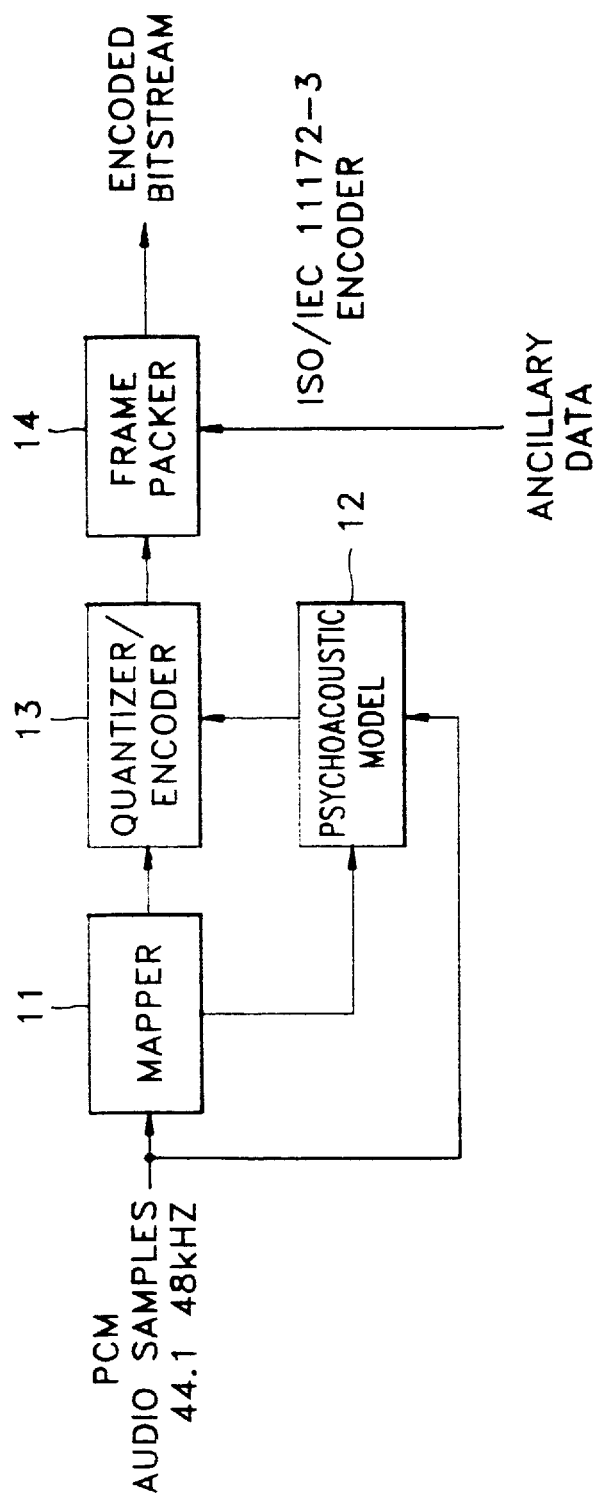
FIG. 1 is a block diagram of the basic structure of an MPEG international standardized encoder.

FIG. 1 is a block diagram of an audio encoder adopting a high-speed band analysis filter (here, an MPEG audio standard IS 11172-3 encoder) according to the present invention.

The audio encoder of FIG. 1 has a mapper 11 for analysis-windowing and time/frequency mapping an input signal, a psychoacoustic model 12 for assigning bits to each band by using psychoacoustic characteristics, a quantizer/encoder 13 for quantizing and encoding the mapped signal according to the number of bits assigned to a band, and a frame packer 14 for generating a bit stream.

The mapper 11 classifies an input audio bit stream according to a frequency band using an analysis window. Time/frequency mapped samples are called subband samples in layer I or II of MPEG IS, or transformed subband samples in layer III. The classification of the signal according to a band contributes to alleviate distribution of noise caused by quantization across the entire bands, when the signals are reconstructed.

The psychoacoustic model 12 models the procedure of human perception of sound, using especially a masking phenomenon and a critical band among psychoacoustic characteristics. The psychoacoustic model 12 produces a data set for controlling quantization and encoding.

The quantizer/encoder 13 performs quantization and encoding to prevent errors involved in signal reconstruction from being perceived by a human being, using the result of computations in the psychoacoustic model 12.

The frame packer 14 efficiently combines quantized data with information needed for decoding, and produces a bit stream by the Huffman coding method.

Figure 2:
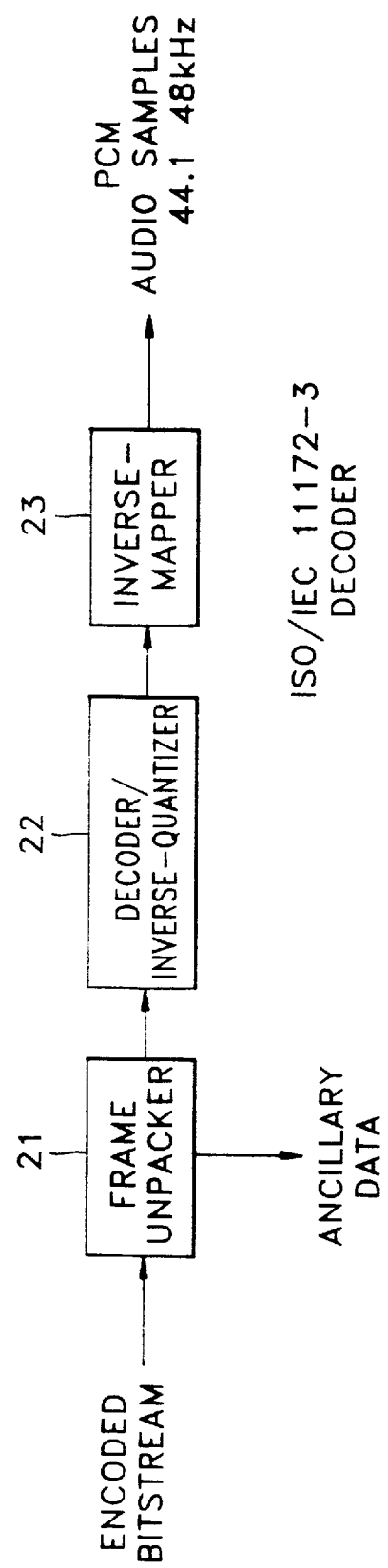
FIG. 2 is a block diagram of the basic structure of an MPEG international standardized decoder.

FIG. 2 is a block diagram of an audio decoder adopting a high-speed band synthesis filtering algorithm (here, an MPEG audio standard IS 11172-3 decoder) according to the present invention.

The decoder of FIG. 2 has a frame unpacker 21 for unpacking a signal from an input bit stream, a decoder/inverse-quantizer 22 for decoding and inverse-quantizing the quantized signal, and an inverse-mapper 23 for time/frequency inverse-mapping and synthesis-windowing the inverse-quantized signal.

The frame unpacker 21 separates quantized audio data and other additional information to be decoded from an encoded bit stream.

The decoder/inverse-quantizer 22 reconstructs the quantized audio data to the values prior to quantization using the quantization step-size.

The inverse-mapper 23 converts frequency-domain data to time-domain data. The time-domain sample values are synthesis-windowed and converted to the time-domain signal by overlap-and-add (OLA).

Meanwhile, a band dividing filter used in the mapper 11 of FIG. 1 can be defined as $$X_m[k] = \frac{1}{M} \sum_{n=0}^{2KM-1} h[n]x_m[n]\cos\left[\left(n - \frac{M}{2}\right)\left(k + \frac{1}{2}\right)\frac{\pi}{M}\right], \quad (1)$$

-continued here, $0 \leq k < M$ where m is the number of a block, M is the size of a divided band, 2KM is the size of an analysis window, K is a constant proportional to a relationship between the window size and the size of the divided band, $X_m[k]$ is an mth signal block obtained by formatting the input signal into blocks, h[n] is a coefficient of an analysis window, and $X_m[k]$ is a signal of a kth band transformed from the mth block signal.

1-1) International Standard

Figure 3:
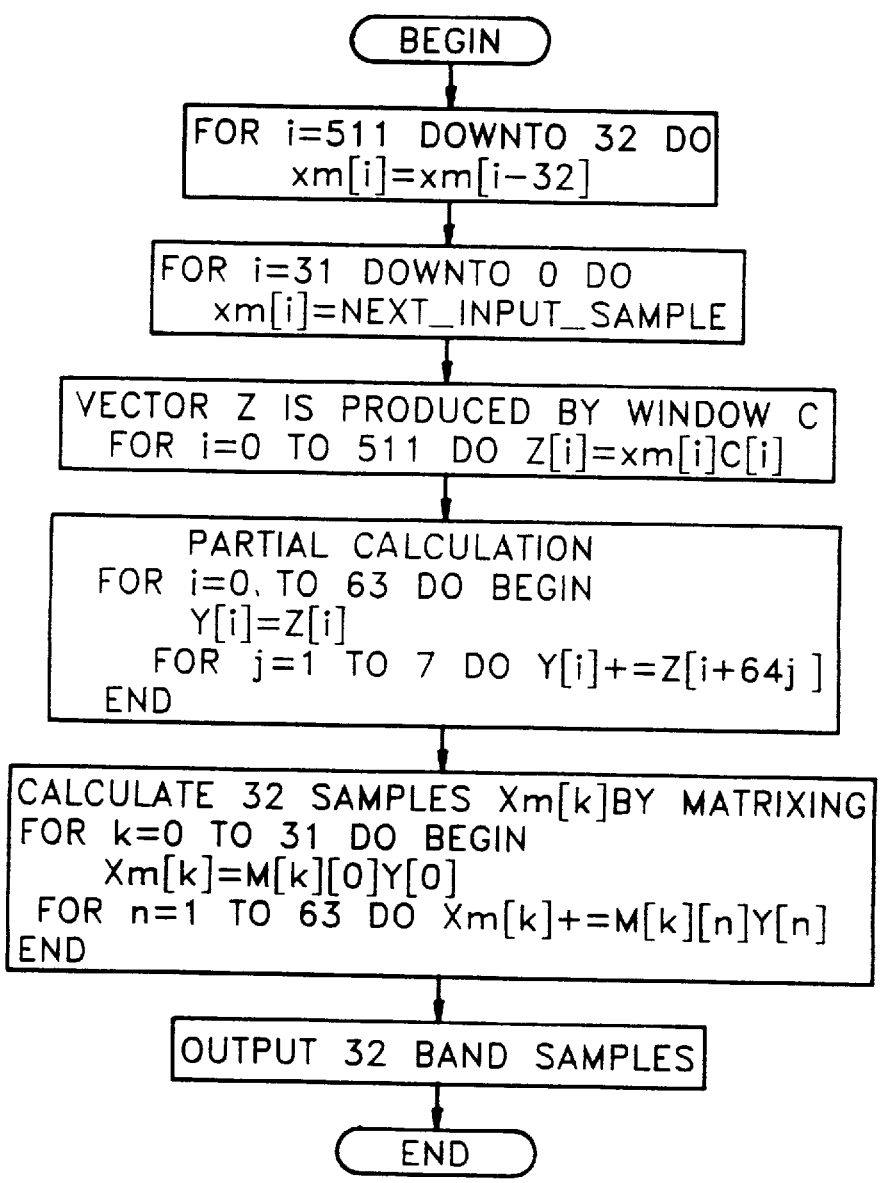
FIG. 3 is flowchart of an algorithm for an analysis filter used in the MPEG international standardized encoder of FIG. 1.

An algorithm as provided by the international standard is transformed into an algorithm with K of 8 and M of 32 as shown in FIG. 3 by reducing equation (1) to equation (2) using the periodicity of cosine cycle.

$$X_m[k] = \sum_{n=0}^{2K-1} M[k][n]Y_m[n], \quad 0 \leq n < M \quad (2)$$

The parameters of equation (2) are defined as follows:

$$Y_m[n] = \sum_{p=0}^{K-1} Z_m[2pM + n], \quad 0 \leq n < 2M \quad (3)$$

$$Z_m[n] = C[n]x_m[n], \quad 0 \leq n < 2KM \quad (4)$$

$$C[2pM + n] = (-1)^p \frac{1}{M} h[2pM + n], \quad 0 \leq p < K, \quad 0 \leq n < 2M \quad (5)$$

$$M[k][n] = \cos\left[\left(n - \frac{M}{2}\right)\left(k + \frac{1}{2}\right)\frac{\pi}{M}\right], \quad (6)$$

$$0 \leq k < M, \quad 0 \leq n < 2M$$

1-2) Fast Algorithm I

Equations (2) and (6) for the algorithm of the international standard are not fully simplified from equation (1) and have large memory requirements. Therefore, a new algorithm is produced from equation (1) in the present invention.

By the permutation that $$s = n + \frac{3}{2} M, \quad xt[s] = \frac{1}{M} x_m\left[s - \frac{3}{2} M\right] h\left[s - \frac{3}{2} M\right] \quad (7)$$

Taking into account equation (7), equation (1) is rewritten as $$X_m[k] = \sum_{s=3M/2}^{(2K+3/2)M-1} xt[s]\cos\left[(s - 2M)\left(k + \frac{1}{2}\right)\frac{\pi}{M}\right] \quad (8)$$

$$= \sum_{s=3M/2}^{(2K+3/2)M-1} -xt[s]\cos\left[s\left(k + \frac{1}{2}\right)\frac{\pi}{M}\right]$$

If it is assumed that xt[s]=0 in the case of s<3M/2, or s>(2K+3/2)M, equation (8) is rewritten as $$X_m[k] = \sum_{l=0}^{2K-1} \sum_{u=(l+1)M}^{(l+2)M-1} -xt[u]\cos\left[u\left(k + \frac{1}{2}\right)\frac{\pi}{M}\right] \quad (9)$$

When equation (9) is divided with l=2r and l=2r+1, equation (9) is rewritten as $$X_m[k] = \sum_{r=0}^{K} \sum_{u=(2r+1)M}^{(2r+2)M-1} -xt[u]\cos\left[u\left(k + \frac{1}{2}\right)\frac{\pi}{M}\right] + \quad (10)$$

-continued $$\sum_{r=0}^{K-1} \sum_{u=(2r+2)M}^{(2r+3)M-1} -xt[u]\cos\left[u\left(k+\frac{1}{2}\right)\frac{\pi}{M}\right]$$

By the permutation that $v=(2r+2)M-1-u$ in the first term of equation (10) and $v=(2r+2)M+u$ in the second term thereof, equation (10) can be rewritten as $$X_m[k] = \sum_{r=0}^{K} \sum_{v=0}^{M-1} -xt[(2r+2)M-1- \qquad (11)$$

$$v]\cos\left[((2r+2)M-1-v)\left(k+\frac{1}{2}\right)\frac{\pi}{M}\right] +$$

$$\sum_{r=0}^{K-1} \sum_{v=0}^{M-1} -xt[(2r+2)M+v]\cos\left[((2r+2)M+v)\left(k+\frac{1}{2}\right)\frac{\pi}{M}\right] =$$

$$\sum_{r=0}^{K} \sum_{v=0}^{M-1} xt[(2r+2)M-1-v](-1)^r\cos\left[(v+1)\left(k+\frac{1}{2}\right)\frac{\pi}{M}\right] +$$

$$\sum_{r=0}^{K-1} \sum_{v=0}^{M-1} xt[(2r+2)M+v](-1)^r\cos\left[v\left(k+\frac{1}{2}\right)\frac{\pi}{M}\right]$$

By the permutation $p=v+1$ and $xt[(2r+2)M]\cos[(k+1/2)\pi/M]=0$ if $v=M-1$ in the first term of equation (11) and $p=v$ in the second term thereof, equation (11) can be rewritten as $$X_m[k] = \qquad (12)$$

$$\sum_{r=0}^{K} \sum_{p=1}^{M-1} xt[(2r+2)M-p](-1)^r\cos\left[p\left(k+\frac{1}{2}\right)\frac{\pi}{M}\right] +$$

$$\sum_{r=0}^{K-1} \sum_{p=1}^{M-1} xt[(2r+2)M+p](-1)^r\cos\left[p\left(k+\frac{1}{2}\right)\frac{\pi}{M}\right]$$

Here, equation (12) can be rewritten as $$X_m[k] = \sum_{p=0}^{M-1} u[p]\cos\left[p\left(k+\frac{1}{2}\right)\frac{\pi}{M}\right] \qquad (13)$$

In equation (13), $u[p]$ is defined as $$u[p] = \sum_{r=0}^{K-1} (-1)^r xt[(2r+2)M], \qquad \text{if } p=0 \qquad (14)$$

$$= \sum_{r=0}^{K} (-1)^r xt[(2r+2)M-p] +$$

$$\sum_{r=0}^{K-1} (-1)^r xt[(2r+2)M+p], \qquad \text{if } p \neq 0$$

Taking into account equation (7), and assuming that $X_m[n]=0$ and $h[n]=0$ when $n<0$ or $n>-2KM$, equation (14) is rewritten as $$u[p] = \sum_{r=0}^{K-1} (-1)^r x_m\left[\left(2r+\frac{1}{2}\right)M\right] h\left[\left(2r+\frac{1}{2}\right)M\right]\frac{1}{M}, \qquad \text{if } p=0 \qquad (15)$$

$$= \sum_{r=0}^{K} (-1)^r x_m\left[\left(2r+\frac{1}{2}\right)M-p\right] h\left[\left(2r+\frac{1}{2}\right)M-p\right]\frac{1}{M} +$$

$$\sum_{r=0}^{K-1} (-1)^r x_m\left[\left(2r+\frac{1}{2}\right)M+p\right] h\left[\left(2r+\frac{1}{2}\right)M+p\right]\frac{1}{M}, \qquad \text{if } p \neq 0$$

Equation (15) can be expressed as follows according to the range of p by using a filter coefficient $C[n]$ as defined in equation (5) in the international standard.

$$u[p] = \sum_{r=0}^{K-1} x_m\left[\left(2r+\frac{1}{2}\right)M\right] C\left[\left(2r+\frac{1}{2}\right)M\right], \text{if } p=0 \qquad (16a)$$

$$u[p] = \sum_{r=0}^{K-1} \left\{ x_m\left[\left(2r+\frac{1}{2}\right)M-p\right] C\left[\left(2r+\frac{1}{2}\right)M-p\right] + \qquad (16b) \right.$$

$$x_m\left[\left(2r+\frac{1}{2}\right)M+p\right] C\left[\left(2r+\frac{1}{2}\right)M+p\right] \right\}, \text{if } 0<p<\frac{M}{2}$$

$$u[p] = \sum_{r=0}^{K-1} \{x_m[2rM]C[2rM]+x_m[2rM+M]C[2rM+M]\}, \text{if } p=\frac{M}{2} \qquad (16c)$$

$$u[p] = \qquad (16d)$$

$$\sum_{r=0}^{K-1} \left\{ -x_m\left[\left(2r+\frac{5}{2}\right)M-p\right] C\left[\left(2r+\frac{5}{2}\right)M-p\right] + \right.$$

$$x_m\left[\left(2r+\frac{1}{2}\right)M+p\right] C\left[\left(2r+\frac{1}{2}\right)M+p\right] \right\}, \text{if } \frac{M}{2}<p<M$$

Figure 4:
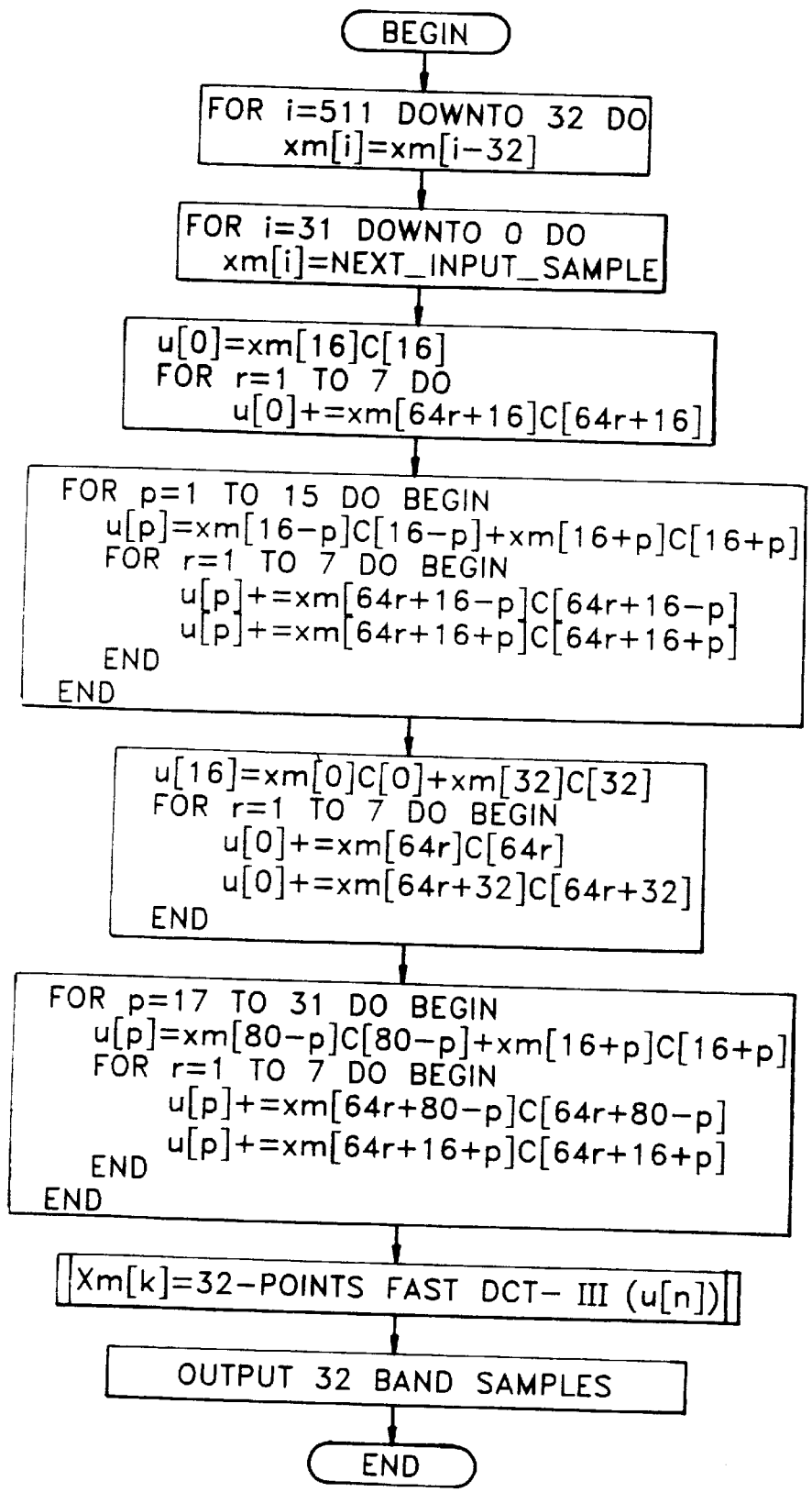
FIG. 4 is a flowchart of an algorithm I for a high-speed analysis filter according to the present invention.

The number M of signal $u[p]$ is obtained from the number $2KM$ of input signal $x_m[n]$ using equations (14), (15) and (16). By equation (13), the obtained $u[p]$ is obtained by the size M of the DCT-III algorithm. The DCT-III transform equation of equation (13) can be obtained as a fast algorithm. The obtained algorithm can reduce the number $M^2$ of multiplications to $M/2 \times \text{Log}_2 M+1$. A fast analysis filtering algorithm as shown in FIG. 4 can be obtained by equations (13) and (16). FIG. 4 is for the case that $K=8$ and $M=32$.

1-3) Fast Algorithm II

Here, an algorithm different in structure from the above-described fast algorithm I is induced. This algorithm shows the same operational complexity as that of the fast algorithm I, but more regular constitution, thus being suited for parallel processing.

An input signal $x_m[n]$ of an mth block has the following relationship with an input signal $x_{m-r}[n]$ of an (m-r)th block.

$$x_{m-r}[n]=x_m[rM+n], \quad 0 \leq r<2K-1, \quad 0 \leq n<M \ldots \qquad (17)$$

Equation (16) can be expressed as equation (18) by using equation (17).

$$u[p] = \sum_{r=0}^{K-1} x_{m-2r}\left[\frac{M}{2}\right] C\left[\left(2r+\frac{1}{2}\right)M\right], \text{if } p=0 \qquad (18a)$$

$$u[p] = \sum_{r=0}^{K-1} \left\{ x_{m-2r}\left[\frac{M}{2}-p\right] C\left[\left(2r+\frac{1}{2}\right)M-p\right] + \qquad (18b) \right.$$

-continued $$x_{m-2r}\left[\frac{M}{2}+p\right] C\left[\left(2r+\frac{1}{2}\right)M+p\right] \right\}, \text{if } 0<p<\frac{M}{2}$$

-continued $$u[p] = \sum_{r=0}^{K-1} \{x_{m-2r}[0]C[2rM] + x_{m-2r-1}[0]C[2rM+M]\}, \text{ if } p = \frac{M}{2} \quad (18c)$$

$$u[p] = \sum_{r=0}^{K-1} \left\{ -x_{m-2r-1}\left[3\frac{M}{2} - p\right]C\left[\left(2r + \frac{5}{2}\right)M - p\right] + \right. \quad (18d)$$

$$\left. x_{m-2r-1}\left[-\frac{M}{2} + p\right]C\left[\left(2r + \frac{1}{2}\right)M + p\right] \right\}, \text{ if } \frac{M}{2} < p < M$$

$M_{m-2s}[p]$ is defined as follows by transforming equations (18a) to (18c).

$$M_{m-2s}[p] = \sum_{r=s}^{K-1} x_{m-2r}\left[\frac{M}{2}\right]C\left[\left(2r + \frac{1}{2}\right)M\right], \text{ if } p = 0 \quad (19a)$$

$$M_{m-2s}[p] = \sum_{r=0}^{K-1} \left\{ x_{m-2r}\left[\frac{M}{2} - p\right]C\left[\left(2r + \frac{1}{2}\right)M - p\right] + \right. \quad (19b)$$

$$\left. x_{m-2r}\left[\frac{M}{2} + p\right]C\left[\left(2r + \frac{1}{2}\right)M + p\right] \right\}, \text{ if } 0 < p < \frac{M}{2}$$

$$M_{m-2s}[p] = \sum_{r=s}^{k-1} x_{m-2r}[0]C[2rM], \text{ if } p - \frac{M}{2} \quad (19c)$$

$UM_{m-2s-1}[p]$ is defined as follows by transforming equations (18c) and (18d).

$$UM_{m-2s-1}[p] = \sum_{r=s}^{K-1} x_{m-2r}[0]C[2rM+M], \text{ if } p = 0 \quad (20a)$$

$$UM_{m-2s-1}[p] = \sum_{r=s}^{K-1} \{-x_{m-2r}[M-p]C[(2r+2)M-p] + \quad (20b)$$

$$x_{m-2r}[p]C[(2r+1)M+p]\}, \text{ if } 0 < p < \frac{M}{2}$$

Equation (19) can be changed into equation (21) by using an R sample time delay operator $Z^{-R}\{\ \}$, in the case that $0 \leq s < K-1$.

$$UM_{m-2s}[p] = \quad (21a)$$

$$z^{-2M}\left\{UM_{m-2s-2}[p] + x_m\left[\frac{M}{2}\right]C\left[\left(2s + \frac{1}{2}\right)M\right]\right\}, \text{ if } p = 0$$

$$UM_{m-2s}[p] = z^{-2M}\{UM_{m-2s-2}[p]\} + \quad (21b)$$

$$x_m\left[\frac{M}{2} - p\right]C\left[\left(2s + \frac{1}{2}\right)M - p\right] +$$

$$x_m\left[\frac{M}{2} + p\right]C\left[\left(2s + \frac{1}{2}\right)M + p\right], \text{ if } 0 < p < \frac{M}{2}$$

$$UM_{m-2s}[p] = z^{-2M}\{UM_{m-2s-2}[p]\} + x_m[0]C[2sM], \text{ if } p = \frac{M}{2} \quad (21c)$$

Equation (20) can also be changed into equation (22) by using the R sample time delay operator $Z^{-R}\{\ \}$, in the case that $0 \leq s < K-1$.

$$UM_{m-2s-1}[p] = z^{-2M}\{UM_{m-2s-3}[p]\} + x_m[0]C[(2sM+M)], \text{ if } p = 0 \quad (22a)$$

$$UM_{m-2s-1}[p] = z^{-2M}\{UM_{m-2s-3}[p]\} - \quad (22b)$$

$$x_m[M-P]C[(2s+2)M-p] + x_m[p]C[(2s+1)M+p], \text{ if } 0 < p < \frac{M}{2}$$

Also, u(p) of equation (18) can be expressed as follows by using $UM_{m-2s}[p]$ defined in equations (19) and (20).

$$u[p] = UM_{m-0}[p], \text{ if } 0 \leq p < \frac{M}{2} \quad (23a)$$

-continued $$u[p] = UM_{m-0}[p] + z^{-M}\left\{UM_{m-1}\left[p - \frac{M}{2}\right]\right\}, \text{ if } p = \frac{M}{2} \quad (23b)$$

$$u[p] = z^{-M}\left\{UM_{m-1}\left[p - \frac{M}{2}\right]\right\}, \text{ if } \frac{M}{2} \leq p < M \quad (23c)$$

Figure 5:
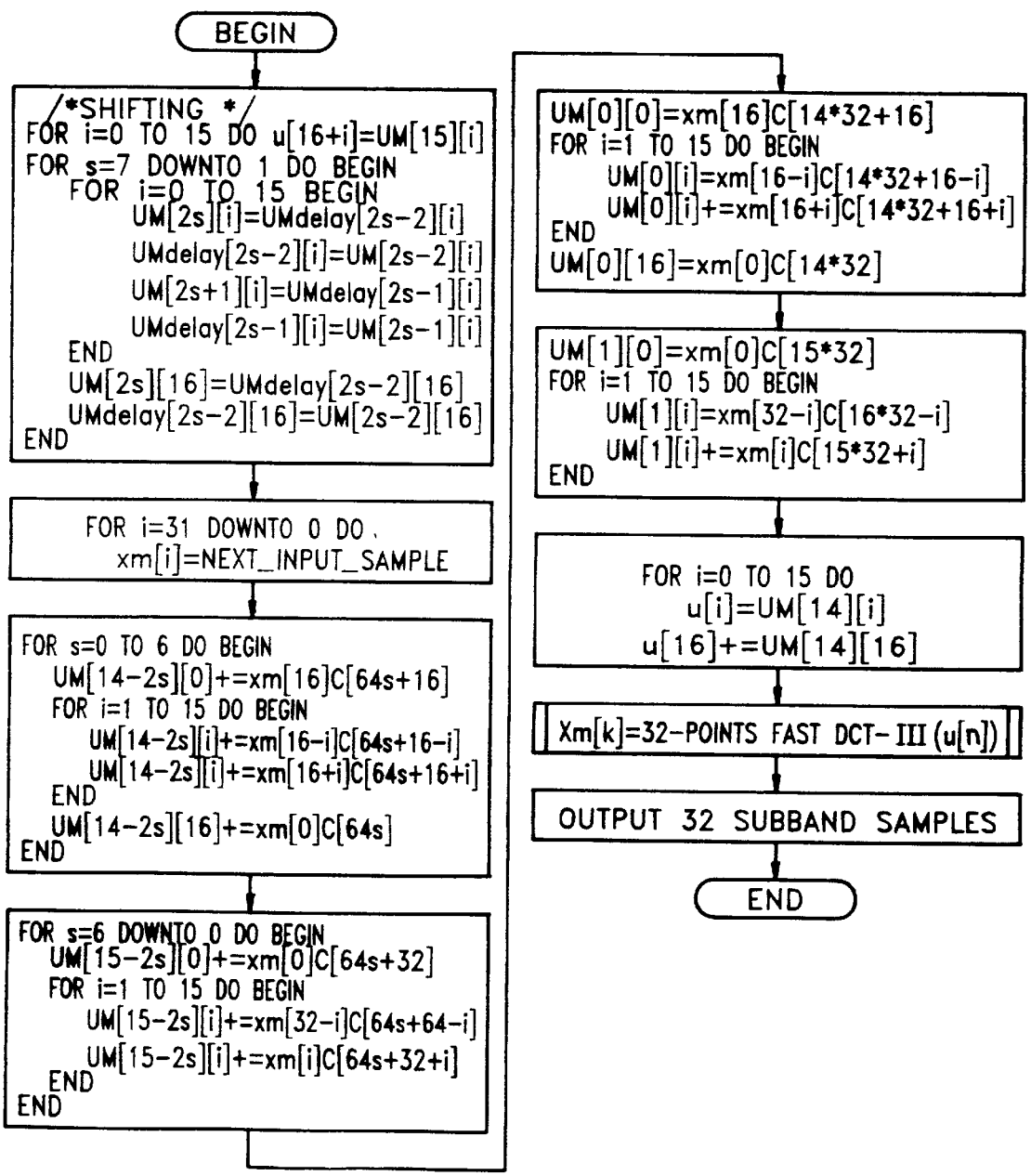
FIG. 5 is a flowchart of an algorithm II for the high-speed analysis filter according to the present invention.

A band-divided signal can be obtained by computing u[p] according to equation (23) as shown in FIG. 5, and using a fast DCT algorithm. As noted from equation (23), a previous computed and delayed term stored in a buffer is added to the computation result of a newly input block signal, and the added value is stored in the buffer. Here, the computation result stored in the buffer is independent, thus facilitating parallel processing relative to the fast algorithm I. FIG. 5 shows a fast algorithm with K=8 and M=32.

A band synthesis filtering algorithm used in the inverse-mapper 23 of FIG. 1 will be described.

A signal divided into 2KM bands is generated by equation (1). When the 2KM signals are transferred to the decoder, the signals can be reconstructed by the inverse transform of equation (24) and OLA such as equation (25).

$XQ_m[k]$ of equation (24) is a signal including quantization noise generated in quantization and inverse-quantization to a signal $x_m[k]$ produced by equation (1).

$$xq_m[n] = \frac{1}{2K} \sum_{k=0}^{2KM-1} XQ_m[k]\cos\left[\left(n + \frac{M}{2}\right)\left(k + \frac{1}{2}\right)\frac{\pi}{M}\right] \quad (24)$$

A signal produced by equation (1) has the following periodicity:

$$xr_m[n] = \sum_{q=0}^{2K-1} xq_{m-q}[qM+n]f[qM+n], 0 \leq n < M \quad (25)$$

$$X_m[2rM+k] = X_m[k], 0 \leq r < K\ 0 \leq k < M \quad (26a)$$

$$X_m[2rM-1-k] = X_m[k], 0 \leq r < K\ 0 \leq k < M \quad (26b)$$

In equation (25), f[n] is a synthesizing window coefficient.

Therefore, an inverse-transformed signal of equation (24) can be obtained only with M signals produced by equation (1). That is, by permutation, equation (24) is expressed as:

$$z_m[n] = xq_m\left[n - \frac{M}{2}\right] = \frac{1}{2K} \sum_{k=0}^{2KM-1} XQ_m[k]\cos\left[n\left(k + \frac{1}{2}\right)\frac{\pi}{M}\right] \quad (27)$$

By the permutation that k=2rM+s ($0 \leq r < k$, $0 \leq s < 2M$), equation (27) is rewritten as $$z_m[n] = \frac{1}{2K} \sum_{r=0}^{K-1} \sum_{s=0}^{2M-1} XQ_m[2rM+s]\cos\left[n\left(s + \frac{1}{2}\right)\frac{\pi}{M}\right] \quad (28)$$

Taking into account the periodicity of equation (26a), equation (28) is rewritten as $$z_m[n] = \frac{1}{2K} \sum_{s=0}^{2M-1} KXQ_m[s]\cos\left[n\left(k + \frac{1}{2}\right)\frac{\pi}{M}\right] \quad (29)$$

By the permutations that l=s in the case that $0 \leq s < M$, and l=2M-1-s in the case that $M \leq s < 2M$, relying on the characteristics of equation (26b), equation (29) is rewritten as $$z_m[n] = \frac{1}{2} \sum_{l=0}^{M-1} XQ_m[l]\cos\left[n\left(l + \frac{1}{2}\right)\frac{\pi}{M}\right] + \quad (30)$$

$$\frac{1}{2} \sum_{l=0}^{M-1} XQ_m[2M-1+l]\cos\left[n\left(2M-1-l+\frac{1}{2}\right)\frac{\pi}{M}\right] =$$

-continued
$$\sum_{l=0}^{M-1} XQ_m[l]\cos\left[n\left(l+\frac{1}{2}\right)\frac{\pi}{M}\right]$$

Accordingly, $$xq_m[n] = z_m\left[n+\frac{M}{2}\right] = \sum_{l=0}^{M-1} XQ_m[l]\cos\left[\left(n+\frac{M}{2}\right)\left(l+\frac{1}{2}\right)\frac{\pi}{M}\right] \quad (31)$$

where $xq_m[n]$ is an inverse transformed signal, that is an inverse-transformed signal.

A signal can be reconstructed by transmitting information of not 2KM bands but m bands, operating $xq_m$ using equation (30), and applying the result to equation (25). As a result, M band-divided signals are encoded in practice.

As the band-divided signal of equation (26) has periodicity, so does a band-synthesized signal $xq_m[n]$ or $x_m[n]$ as follows:

$$xq_m[2rM+n]=(-1)^r xq_m[n], \; z_m[2rM+n]=(-1)^r z_m[n] \quad (32)$$

When equation (25) is divided with q=2p and q=2p+1 and the periodicities of equation (32) is used, $$xr_m = \sum_{p=0}^{K-1} (-1)^p xq_{m-2p}[n]/[2PM+n] + \quad (33)$$

$$\sum_{p=0}^{K-1} (-1)^p xq_{m-2p-1}[M+n]/[2pM+M+n]$$

2-1) International Standard

Figure 6:
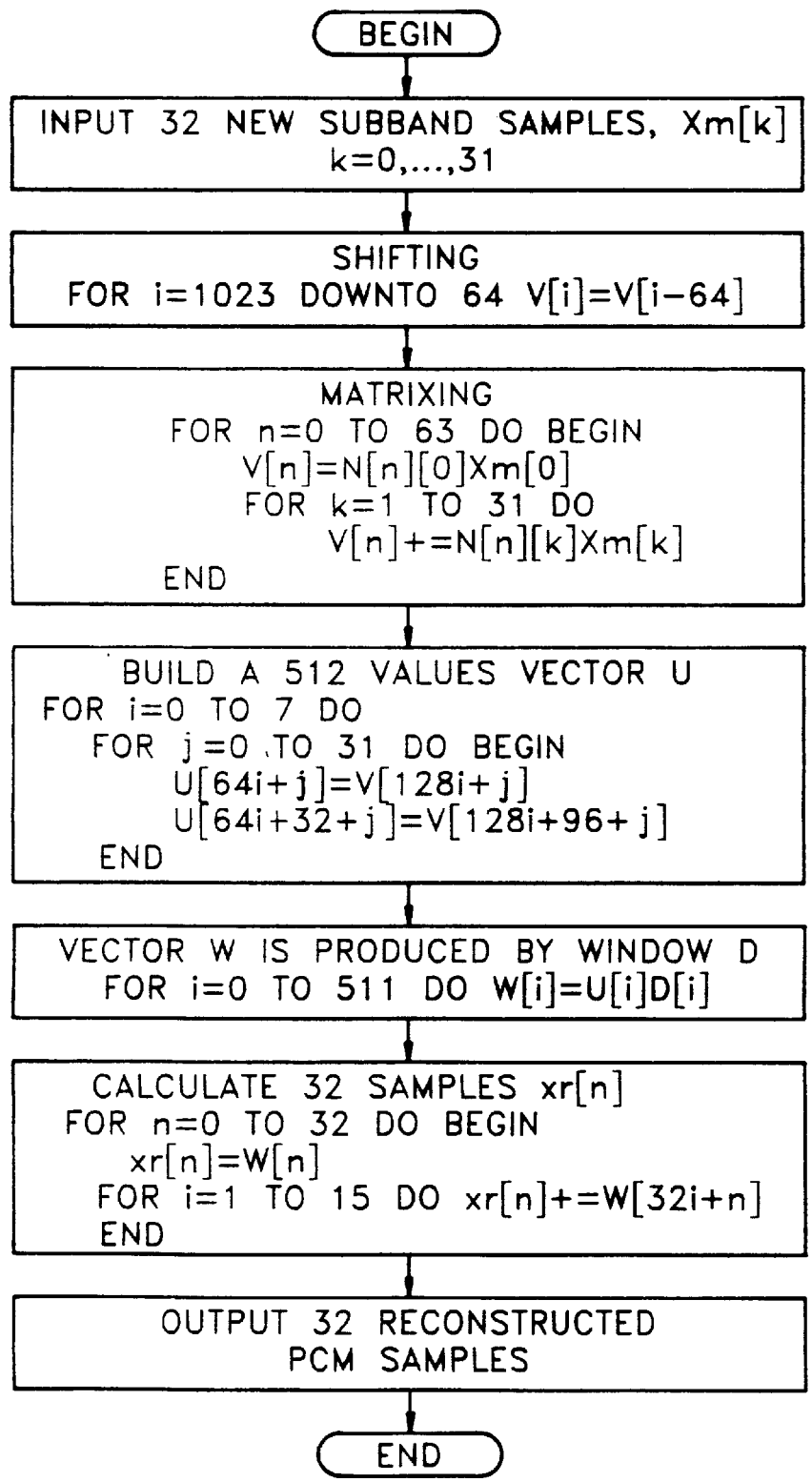
FIG. 6 is a flowchart of an algorithm for an analysis filter used in the MPEG international standardized decoder of FIG. 2.

An algorithm as shown in FIG. 6 is achieved for the audio decoder of FIG. 2 by producing the following equation, using equation (33). FIG. 6 is for the case that K=8 and M=32.

$$xr_m[n] = \sum_{p=0}^{K-1} V_{m-2p}[n]D[2PM+n] + \quad (34)$$

$$\sum_{p=0}^{K-1} V_{m-2p-1}[M+n]D[2PM+M+n]$$

where D(n) and $V_m(n)$ are defined as $$D[2PM+n] = (-1)^p f[2PM+n], \; 0 \le p < M \; 0 \le n < 2M \quad (35)$$

$$V_m[n] = \sum_{l=0}^{M-1} XQ_m[l]N[n][l], \; 0 \le n < 2M \quad (36)$$

where N[n][l] is a matrix calculated by $$N[n][l] = \cos\left[\left(n+\frac{M}{2}\right)\left(l+\frac{1}{2}\right)\frac{\pi}{M}\right] \quad (37)$$

However, the algorithm for the international standard does not utilize periodicity enough and requires a large memory for operations of a synthesis filtering algorithm. Thus, a faster algorithm can be achieved by rearranging equation (35).

2-2) Fast Algorithm I

Using equations (31) and (35), equation (33) can be rewritten as $$xr_m[n] = \sum_{p=0}^{K-1} z_{m-2p}\left[n+\frac{M}{2}\right] D[2pM+n] + \quad (38)$$

-continued
$$\sum_{p=0}^{K-1} z_{m-2p-1}\left[\frac{3}{2}M+n\right] D[2pM+M+n]$$

When the symmetry of equation (36b) is utilized in the second term of equation (38), $$xr_m[n] = \sum_{p=0}^{K-1} z_{m-2p}\left[n+\frac{M}{2}\right] D[2PM+n] + \quad (39)$$

$$\sum_{p=0}^{K-1} -z_{m-2p-1}\left[\frac{M}{2}-n\right] D[2pM+M+n]$$

which is expressed as follows, using the periodicity of equation (32) according to the range of n:

$$xr_m[n] = \sum_{p=0}^{K-1} \left\{ z_{m-2p}\left[n+\frac{M}{2}\right] D[2PM+n] - \right. \quad (40a)$$

$$\left. z_{m-2p-1}\left[\frac{M}{2}-n\right] D[2pM+M+n] \right\}, \text{if } 0 \le n < \frac{M}{2}$$
(40b)
$$xr_m[n] = -\sum_{p=0}^{K-1} z_{m-2p-1}\left[\frac{M}{2}-n\right] D[2pM+M+n], \text{if } n = \frac{M}{2}$$

$$xr_m[n] = -\sum_{p=0}^{K-1} \left\{ z_{m-2p}\left[3\frac{M}{2}-n\right] D[2PM+n] + \right. \quad (40c)$$

$$\left. z_{m-2p-1}\left[n-\frac{M}{2}\right] D[2pM+M+n] \right\}, \text{if } \frac{M}{2} < n < M$$

Figure 7:
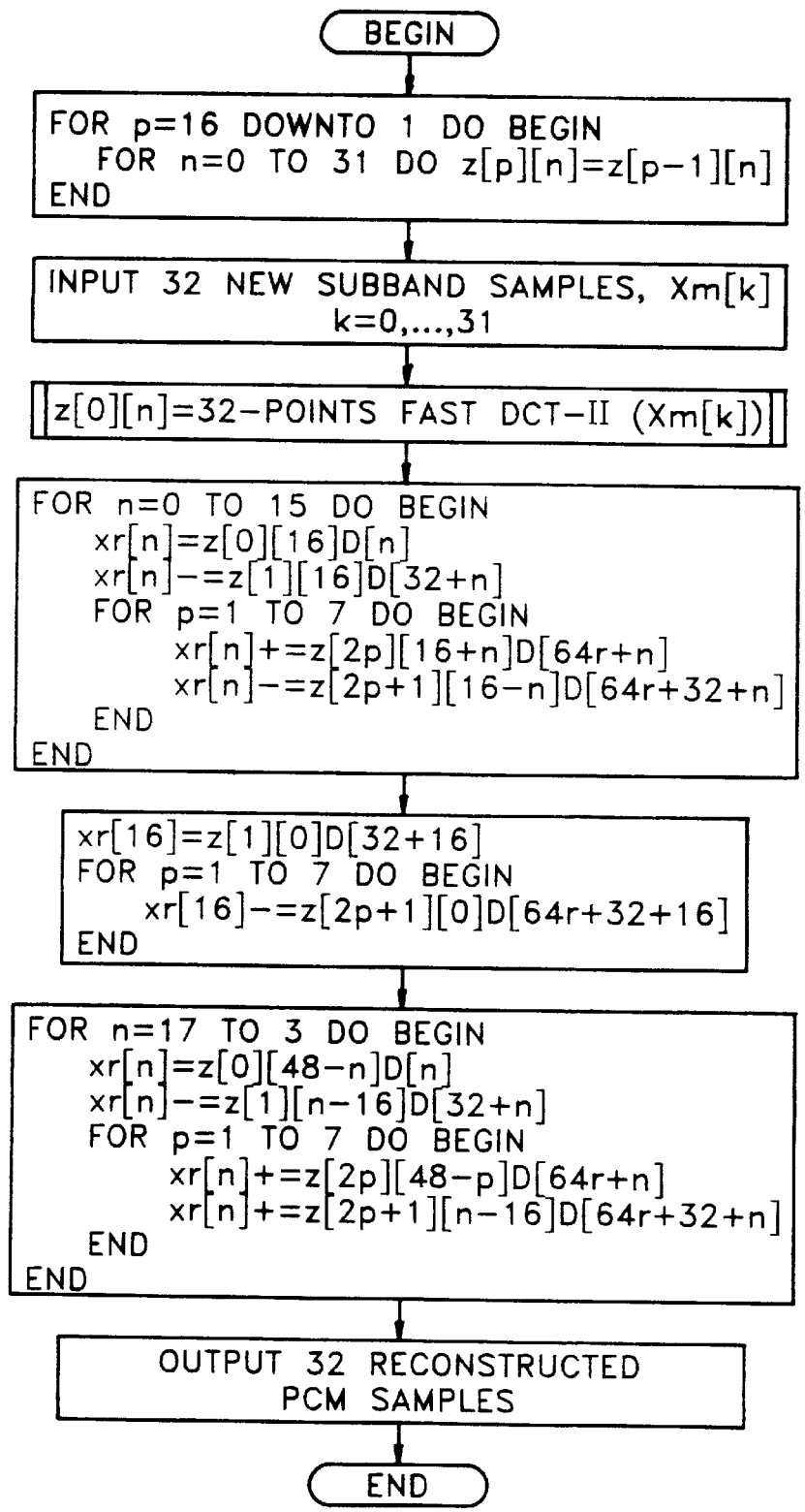
FIG. 7 is a flowchart of an algorithm I for a high-speed synthesis filtering algorithm according to the present invention.

A signal is rapidly reconstructed by computing $x_m[n]$ by equation (30) and substituting the computed $x_m[n]$ in equation (40). Inverse operation of DCT-II for an analysis filter serves to be a general DCT-III operation. Since equation (30) is the DCT-III operation, there exists a fast algorithm such as DCT-II. The obtained algorithm can reduce the number of multiplications from $M^2$ to $M/2 \times \log_2 M + 1$. Therefore, a fast synthesis filtering algorithm as shown in FIG. 7 can be achieved by equations (3) and (4), under the conditions that K=8 and M=32.

2-3) Fast Algorithm II

Here, an algorithm different in structure from the fast algorithm II is induced. This algorithm has operational complexity as large as that of the fast algorithm II but shows more regular constitution, thus being more suited for parallel processing.

To induce the different structure, a part of equation (40) is defined as $xbu_{m-2s}[n]$ given by $$xbuf_{m-2s}[n] = \sum_{p=s}^{K-1} \left\{ z_{m-2p}\left[n+\frac{M}{2}\right] D[2pM+n] - \right. \quad (41a)$$

$$\left. z_{m-2p-1}\left[\frac{M}{2}-n\right] D[2pM+M+n] \right\}, \text{if } 0 \le n < \frac{M}{2}$$
(41b)
$$xbuf_{m-2s}[n] = -\sum_{p=s}^{K-1} z_{m-2p-1}\left[\frac{M}{2}-n\right] D[2pM+M+n], \text{if } n = \frac{M}{2}$$

$$xbuf_{m-2s}[n] = -\sum_{p=s}^{K-1} \left\{ z_{m-2p}\left[3\frac{M}{2}-n\right] D[2pM+n] + \right. \quad (41c)$$

$$\left. z_{m-2p-1}\left[n-\frac{M}{2}\right] D[2pM+M+n] \right\}, \text{if } \frac{M}{2} < n < M$$

Using the R sample time delay operator $z^R\{\;\}$ provided that $0 \le s < K-1$, equation (20) can be rewritten as $$xbuf_{m-2s}[n] = z^{-2M}\{xbuf_{m-2s-2}[n]\} + z_m \left[ n + \frac{M}{2} \right] D[2sM + n] - \quad (42a)$$

$$z_{m-1} \left[ \frac{M}{2} - n \right] D[2sM + M + n], \text{if } 0 \leq n < \frac{M}{2}$$

$$xbuf_{m-2s}[n] = z^{-2M}\{xbuf_{m-2s-2}[n]\} - \quad (42b)$$

$$z_{m-1} \left[ \frac{M}{2} - n \right] D[2sM + M + n], \text{if } n = \frac{M}{2}$$

$$xbuf_{m-2s}[n] = z^{-2M}\{xbuf_{m-2s-2}[n]\} - z_m \left[ 3\frac{M}{2} - n \right] D[2sM + n] - \quad (42c)$$

$$z_{m-1} \left[ n - \frac{M}{2} \right] D[2sM + M + n], \text{if } \frac{M}{2} < n < M$$

Figure 8:
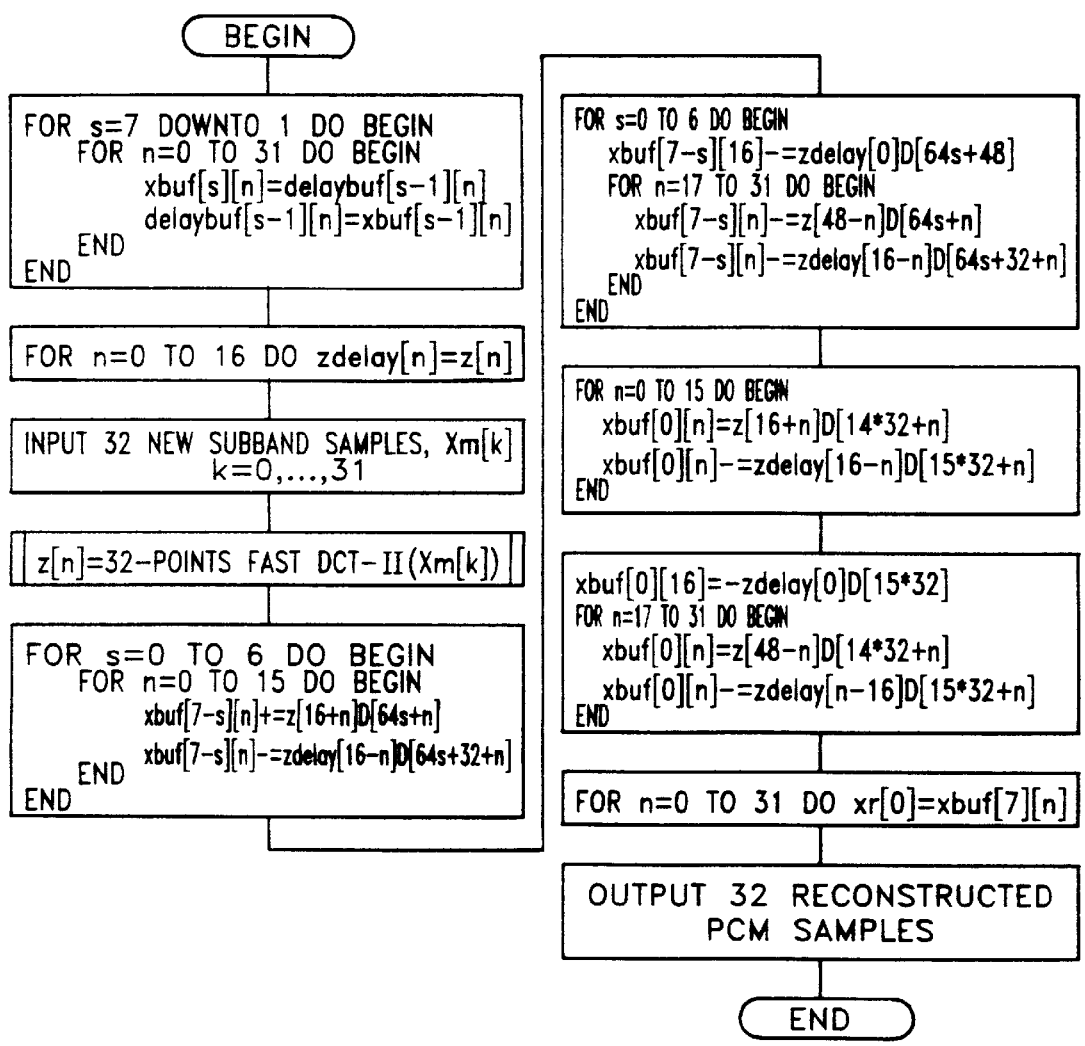
FIG. 8 is a flowchart of an algorithm II for the high-speed synthesis filtering algorithm according to the present invention.

Using equation (42), a reconstructed signal can be obtained from signals $x_m[n]$ and $x_{m-1}[n]$ inversely transformed by the fast DCT-II algorithm. Here, a computation result to be stored in each buffer is independent, thus facilitating parallel processing in contrast to the fast algorithm II. An algorithm as shown in FIG. 8 can be realized by using equation (42) on the condition that K=8 and M=32.

A fast algorithm having a symmetrical window will be described. From an original equation of the international standard, a window coefficient of an analysis filter h[n] and a window coefficient of a synthesizing filter f[n] are given as:

$$h[n] = f[n] \quad (43)$$

Thus, window coefficients C[n] and D[n] of the international standard, which are defined in equations (5) and (35) and are provided as tables, have the following relationship:

$$C[n] = \frac{1}{M} D[n] \quad (44)$$

Equation (44) contributes to the decrease of memory requirements in a system using both encoder and decoder.

Further, the window coefficients have the following symmetry:

$$h[n] = h[2KM - n] \quad (45)$$

C[n] and D[n] exhibit the following characteristics by equation (45):

$$C[2KM - n] = \begin{cases} C[n], & \text{if } (n \bmod 2M) = 0 \\ -C[n], & \text{otherwise} \end{cases} \quad (46)$$

$$D[2KM - n] = \begin{cases} D[n], & \text{if } (n \bmod 2M) = 0 \\ -D[n], & \text{otherwise} \end{cases} \quad (46)$$

(3-1) Analysis Filter

Using the symmetry of equation (46), from equation (21)

$$UM_{m-2s}[p] = z^{-2M}\{UM_{m-2s-2}[p]\} - \quad (48a)$$

$$x_m \left[ \frac{M}{2} \right] C\left[ \left( 2(K-s) - \frac{1}{2} \right) M \right], \text{if } p = 0$$

$$UM_{m-2s}[p] = z^{-2M}\{UM_{m-2s-2}[p]\} - \quad (48b)$$

$$x_m \left[ \frac{M}{2} - p \right] C\left[ \left( 2(K-s) - \frac{1}{2} \right) M + p \right] -$$

$$x_m \left[ \frac{M}{2} + p \right] C\left[ \left( 2(K-s) - \frac{1}{2} \right) M - p \right] \text{if } 0 < p < \frac{M}{2}$$

$$UM_{m-2s}[p] = z^{-2M}\{UM_{m-2s-2}[p]\} + x_m[0]C[2(K-2)M] \text{if } p = \frac{M}{2} \quad (48c)$$

By replacing s with K−1−s, equation (48) can be rewritten as $$UM_{m-2(K-1-s)}[p] = z^{-2M}\{UM_{m-2(K-s)}[p]\} - \quad (49a)$$

$$x_m \left[ \frac{M}{2} \right] C\left[ \left( 2s + \frac{3}{2} \right) M \right], \text{if } p = 0$$

$$UM_{m-2(K-1-s)}[p] = z^{-2M}\{UM_{m-2(K-s)}[p]\} - \quad (49b)$$

$$x_m \left[ \frac{M}{2} - p \right] C\left[ \left( 2S + \frac{3}{2} \right) M + p \right] -$$

$$x_m \left[ \frac{M}{2} + p \right] C\left[ \left( 2s + \frac{3}{2} \right) M - p \right], \text{if } 0 < p < \frac{M}{2}$$

$$UM_{m-2(K-1-s)}[p] = z^{-2M}\{UM_{m-2(K-s)}[p]\} + \quad (49c)$$

$$x_m[0]C[(2(s+1)M] \text{ if } p = \frac{M}{2}$$

Then, by replacing p with M/2−p, equation (49) can be rewritten as $$UM_{m-2(K-1-s)} \left[ \frac{M}{2} - p \right] = z^{-2M} \left\{ UM_{m-2(K-s)} \left[ \frac{M}{2} - p \right] \right\} - \quad (50a)$$

$$x_m \left[ \frac{M}{2} \right] C\left[ \left( 2s + \frac{3}{2} \right) M \right], \text{if } p = \frac{M}{2}$$

$$UM_{m-2(K-1-s)} \left[ \frac{M}{2} - p \right] = z^{-2M} \left\{ UM_{m-2(K-s)} \left[ \frac{M}{2} - p \right] \right\} - \quad (50b)$$

$$x_m[p]C[(2s+2)M - p] -$$

$$x_m[M-p](M-p)C[(2s+1)M + p]\}, \text{if } 0 < p < \frac{M}{2}$$

$$UM_{m-2(K-1-s)} \left[ \frac{M}{2} - p \right] = z^{-2M} \left\{ UM_{m-2(K-s)} \left[ \frac{M}{2} - p \right] \right\} + \quad (50c)$$

$$x_m[0]C[(2(s+1)M], \text{if } p = 0$$

Through the above procedure, equation (22) can be rewritten as $$UM_{m-2(K-s)+1} \left[ \frac{M}{2} - p \right] = z^{-2M} \left\{ UM_{m-2(K-s)-1} \left[ \frac{M}{2} - p \right] \right\} + \quad (51a)$$

$$x_m[0]C[2sM + M], \text{if } p = \frac{M}{2}$$

$$UM_{m-2(K-s)+1} \left[ \frac{M}{2} - p \right] = z^{-2M} \left\{ UM_{m-2(K-s)-1} \left[ \frac{M}{2} - p \right] \right\} + \quad (51b)$$

$$x_m \left[ \frac{M}{2} + p \right] C\left[ \left( 2s + \frac{1}{2} \right) M - p \right] -$$

$$x_m \left[ \frac{M}{2} - p \right] C\left[ \left( 2s + \frac{1}{2} \right) M + p \right] \}, \text{if } 0 < p < \frac{M}{2}$$

To calculate x and y from a, b, c, and d values as in equation (52), four multiplications should be performed. However, the number of multiplications can be decreased to three using the structure of FIG. 9. This operation is used to increase the speed of multiplications of complex numbers.

$$x = a \times d - b \times c, \quad y = a \times c + b \times d \quad (52)$$

Figure 9:
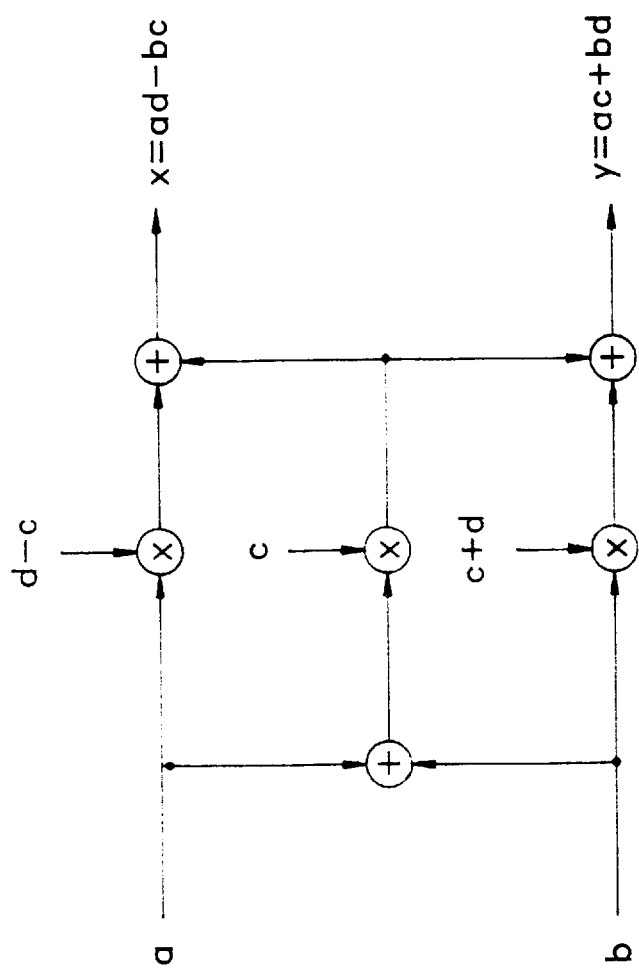
FIG. 9 is a block diagram for reducing the number of multiplications in computation of x=ad−bc and y=ac+bd.

If c and d are constants in FIG. 9, (d−c) and (c+d) are calculated in advance and stored in a memory. Hence, the number of additions increases from two to three. Since time for an addition is shorter than that for a multiplication, time required to calculate x and y is decreased.

Figure 10:
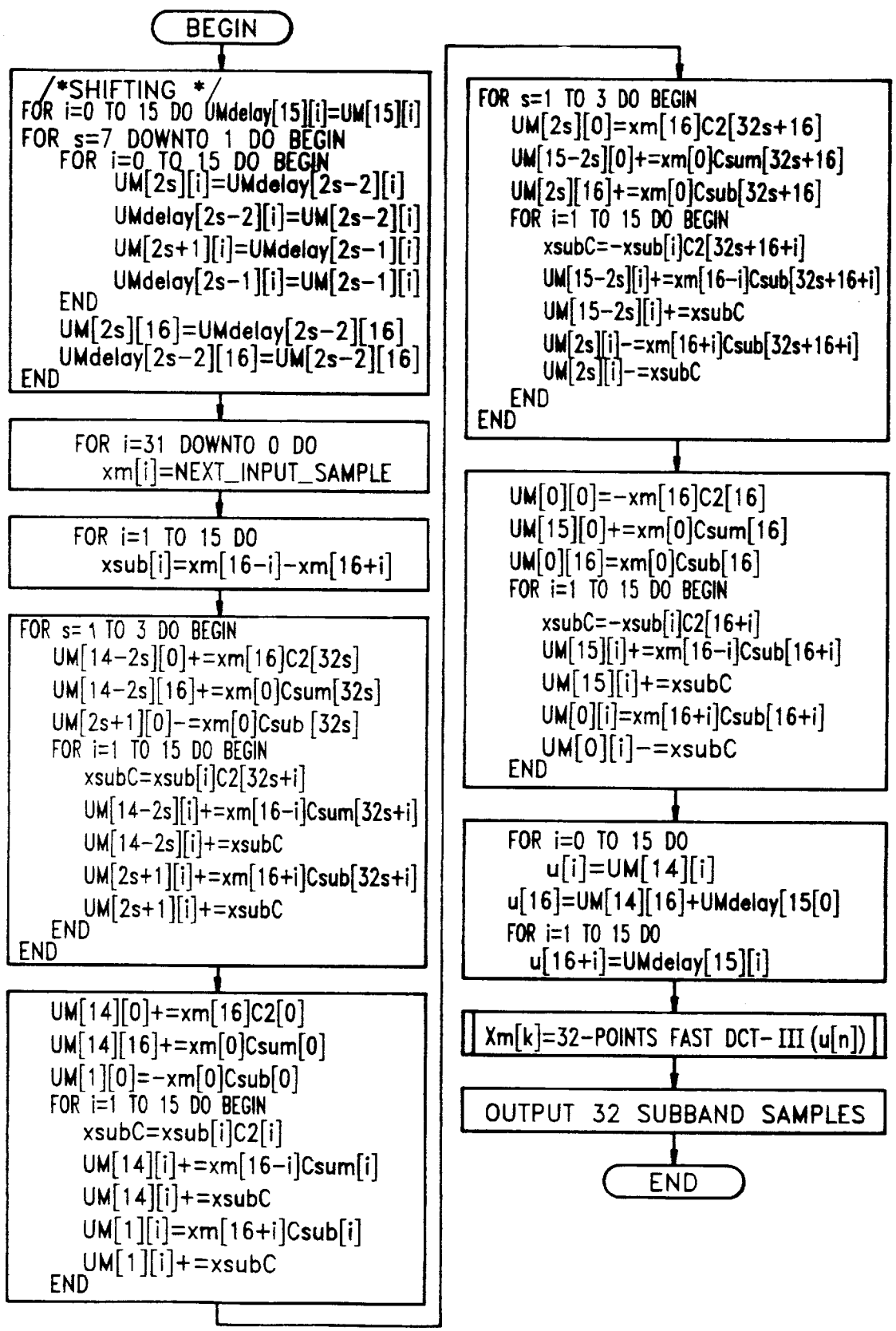
FIG. 10 is a flowchart of an algorithm for a high-speed analysis filter by using symmetry in window coefficients according to the present invention.

However, equations (21b) & (51b), (22b) & (50b), and equation (52) have the same structure. The values of C[n} corresponding to c and d are stored in the memory, thus satisfying the above assumption. Therefore, an algorithm in which equation (21b) is operated with equation (51b), and equation (22b) is operated with equation (50b) can be realized using the structure of FIG. 9, as shown in FIG. 10. FIG. 10 illustrates an algorithm with K of 8 and M of 32. In the structure of FIG. 10, only M/4 window coefficients and the respective sums and differences thereof are stored. Thus, its memory requirements are smaller than that of an algorithm excluding use of symmetry but larger than that of an algorithm exclusively depending on symmetry.

To use the structure of FIG. 9, C2[n], Csum[n], and Csub[n] of FIG. 10 are defined from a coefficient C[n] used for the international standard as in the following equations (54) and (55), calculated in advance, and stored for use.

$$C2[mM+n] \begin{cases} = C\left[2mM + \frac{M}{2} + n\right], & 0 \leq n < \frac{M}{2}, 0 \leq m < \frac{K}{2} \\ = C[2mM + M + n], & \frac{M}{2} \leq n < M, 0 \leq m < \frac{K}{2} \end{cases}$$ (53)

$$Csum[mM+n] \begin{cases} = C[2mM], & n=0, 0 \leq m < \frac{K}{2} \\ = C\left[2mM + \frac{M}{2} - n\right] + C\left[2mM + \frac{M}{2} + n\right], & 1 \leq n < \frac{M}{2}, 0 \leq m < \frac{K}{2} \\ = C[2mM + M], & n = \frac{M}{2}, 0 \leq m < \frac{K}{2} \\ = C[2mM + 2M - n] + C[2mM + M + n], & \frac{M}{2} < n < M, 0 \leq m < \frac{K}{2} \end{cases}$$ (54)

$$Csub[mM+n] \begin{cases} = C[2mM + M], & n=0, 0 \leq m < \frac{K}{2} \\ = C\left[2mM + \frac{M}{2} - n\right] - C\left[2mM + \frac{M}{2} + n\right], & 1 \leq n < \frac{M}{2}, 0 \leq m < \frac{K}{2} \\ = C[2mM + 2M], & n = \frac{M}{2}, 0 \leq m < \frac{K}{2} \\ = C[2mM + 2M - n] - C[2mM + M + n], & \frac{M}{2} < n < M, 0 \leq m < \frac{K}{2} \end{cases}$$ (55)

3-2) Synthesis Filtering Algorithm

The following equation (56) is defined using equations (42b) and (42c).

$$xbuf_{m-2s-1}[n] = xbuf_{m-2s}\left[n + \frac{M}{2}\right], \quad 0 \leq n < \frac{M}{2}$$ (56)

which is rewritten as $$xbuf_{m-2s-1}[n] = z^{-2M}\{xbuf_{m-2s-3}[n]\} -$$ (57a)

$$z_{m-1}[n]D\left[2sM + \frac{3}{2}M\right], \quad \text{if } n = 0$$

$$xbuf_{m-2s-1}[n] = z^{-2M}\{xbuf_{m-2s-3}[n]\} -$$ (57b)

$$z_m[M+n]D\left[\left(2s + \frac{1}{2}\right)M + n\right] -$$

$$z_{m-1}[n]D\left[\left(2s + \frac{3}{2}\right)M + n\right], \quad \text{if } 0 < n < \frac{M}{2}$$

After processing in the analysis filter, equation (42a) can be expressed as $$xbuf_{m-2(K-1-s)}\left[\frac{M}{2} - n\right] = z^{-2M}\left\{xbuf_{m-2s-2}\left[\frac{M}{2} - n\right]\right\} -$$ (58a)

$$z_m(M-n)D\left[\left(2s + \frac{3}{2}\right)M + n\right] +$$

$$z_{m-1}[n]D\left[\left(2s + \frac{1}{2}\right)M + n\right], \quad \text{if } 0 < n < \frac{M}{2}$$

$$xbuf_{m-2(K-1-s)}\left[\frac{M}{2} - n\right] = z^{-2M}\left\{xbuf_{m-2s-2}\left[\frac{M}{2} - n\right]\right\} +$$ (58b)

$$z_m(M-n)D\left[\left(2s + \frac{3}{2}\right)M + n\right] +$$

$$z_{m-1}[n]D\left[\left(2s + \frac{1}{2}\right)M + n\right], \quad \text{if } n = \frac{M}{2}$$

$$xbuf_{m-2(K-s)+1}\left[\frac{M}{2} - n\right] = z^{-2M}\left\{xbuf_{m-2(K-s)-1}\left[\frac{M}{2} - n\right]\right\} -$$ (59a)

-continued $$z_{m-1}\left[\frac{M}{2} - n\right]D\left[2sM + \frac{1}{2}M\right], \quad \text{if } n = \frac{M}{2}$$

Through the same process, equation (57) is rewritten as $$xbuf_{m-2(K-s)+1}\left[\frac{M}{2} - n\right] = z^{-2M}\left\{xbuf_{m-2(K-s)-1}\left[\frac{M}{2} - n\right]\right\} -$$ (59b)

$$z_m\left[\frac{M}{2} + n\right]D\left[\left(2s + \frac{3}{2}\right)M + n\right] -$$

$$z_{m-1}[n]D\left[\left(2s + \frac{1}{2}\right)M + n\right], \quad \text{if } 0 < n < \frac{M}{2}$$

Figure 11:
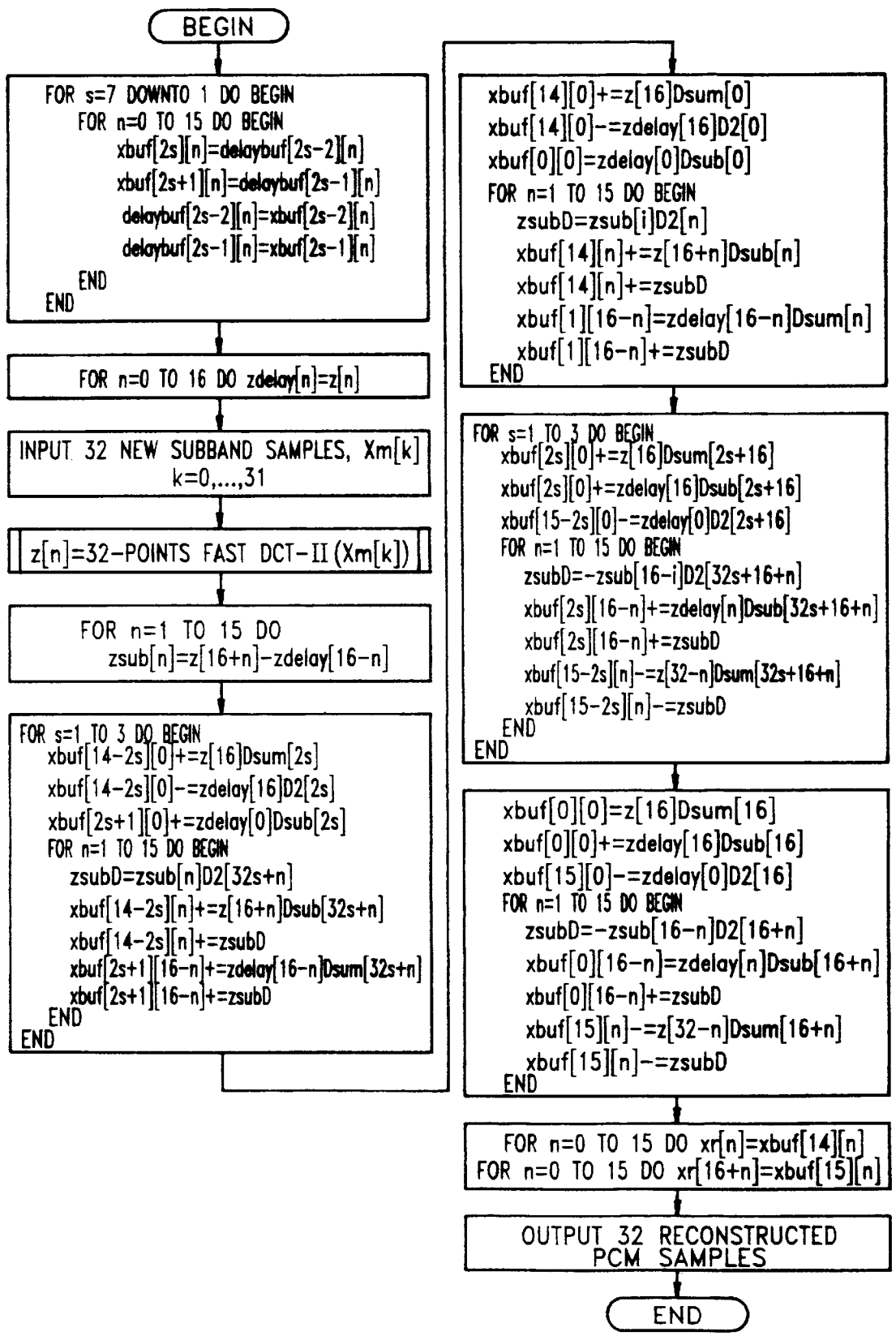
FIG. 11 is a flowchart of an algorithm for a high-speed synthesis filtering algorithm by using symmetry in window coefficients according to the present invention.

Equations (42a) & (59b), equations (57b) & (58a), and equation (52) have the same structure. Therefore, FIG. 9 can be used to perform operations for these equations. FIG. 11 illustrates the case where equations (42a) and (59b) are operated together, and equations (57b) and (58a) are operated together, provided that K=8 and M=32. This structure has window coefficients and memory requirements for their calculation values. The memory requirements 3KM is smaller than that of an algorithm excluding symmetry, i.e., 2KM, and larger than that of an algorithm exclusively depending on symmetry, i.e., 1KM. However, such structure can reduce operational complexity in contrast to the above two algorithms.

To use the structure of FIG. 9, D2[n], Dsum[n], Dsub[n] used in FIG. 11 are defined from the coefficient D[n] used in the international standard as shown in equations (60), (61), and (62), and stored for use in advance.

$$D2[mM+n] = D[2mM+M+n], \quad 0 \leq n < M, 0 \leq m < \frac{K}{2} \tag{60}$$

$$Dsum[mM+n] \begin{cases} = D[2mM], & n=0, 0 \leq m < \frac{K}{2} \\ = D[2mM+n] + D[2mM+M+n], & 1 \leq n < \frac{M}{2}, 0 \leq m < \frac{K}{2} \\ = D[2mM+2M], & n = \frac{M}{2}, 0 \leq m < \frac{K}{2} \\ = D[2mM+n] + C[2mM+M+n], & \frac{M}{2} < n < M, 0 \leq m < \frac{K}{2} \end{cases} \tag{61}$$

$$Dsub[mM+n] \begin{cases} = D\left[2mM+\frac{M}{2}\right], & n=0, 0 \leq m < \frac{K}{2} \\ = D[2mM+n] - D[2mM+M+n], & 1 \leq n < \frac{M}{2}, 0 \leq m < \frac{K}{2} \\ = D[2mM+M], & n = \frac{M}{2}, 0 \leq m < \frac{K}{2} \\ = D[2mM+n] - D[2mM+M+n], & \frac{M}{2} < n < M, 0 \leq m < \frac{K}{2} \end{cases} \tag{62}$$

Meanwhile, the fast algorithms applied to the three analysis and synthesis filtering algorithms suggested in the present invention will be compared in terms of performance, that is, operational complexity and memory requirements. To compare the total number of operations of the international standard method and the method proposed in the present invention with the number of operations of a method suggested by Iwadare and a method suggested by Konstantides, the number of additions and multiplications are shown in [table 1]. In the international standard, K=8 and M=32. Therefore, the number of operations in the case that K=8 and M=32 are specifically shown in [table 1]. As noted from [table 1], an algorithm considering window symmetry uses the smallest number of operations.

TABLE 1

| | number of multiplications | number of additions |
| --- | --- | --- |
| ISO/IEC IS 11172-3 | $2M^2$ + 2KM<br>2560 | $2M^2$ + 2KM − 3M<br>2464 |
| Iwadare method | 2MlogM + 4 + 2KM<br>836 | 3logm + 1 + 2KM − M<br>961 |
| Konstantides method | 0.5MlogM − M + 1 + 2KM<br>593 | 1.5MlogM − M + 1 + 2KM − M<br>689 |
| fast algorithm I fast algorithm II | 0.5MlogM − M + 1 + 2KM − K<br>585 | 1.5MlogM − M + 1 + 2KM − M − K<br>681 |
| fast algorithm in case of symmetrical window | 0.5MlogM − M + 1 + 1.5KM<br>465 | 1.5MlogM − M + 1 + 2KM − 0.5M − K − 1<br>696 |

Figure 12A:
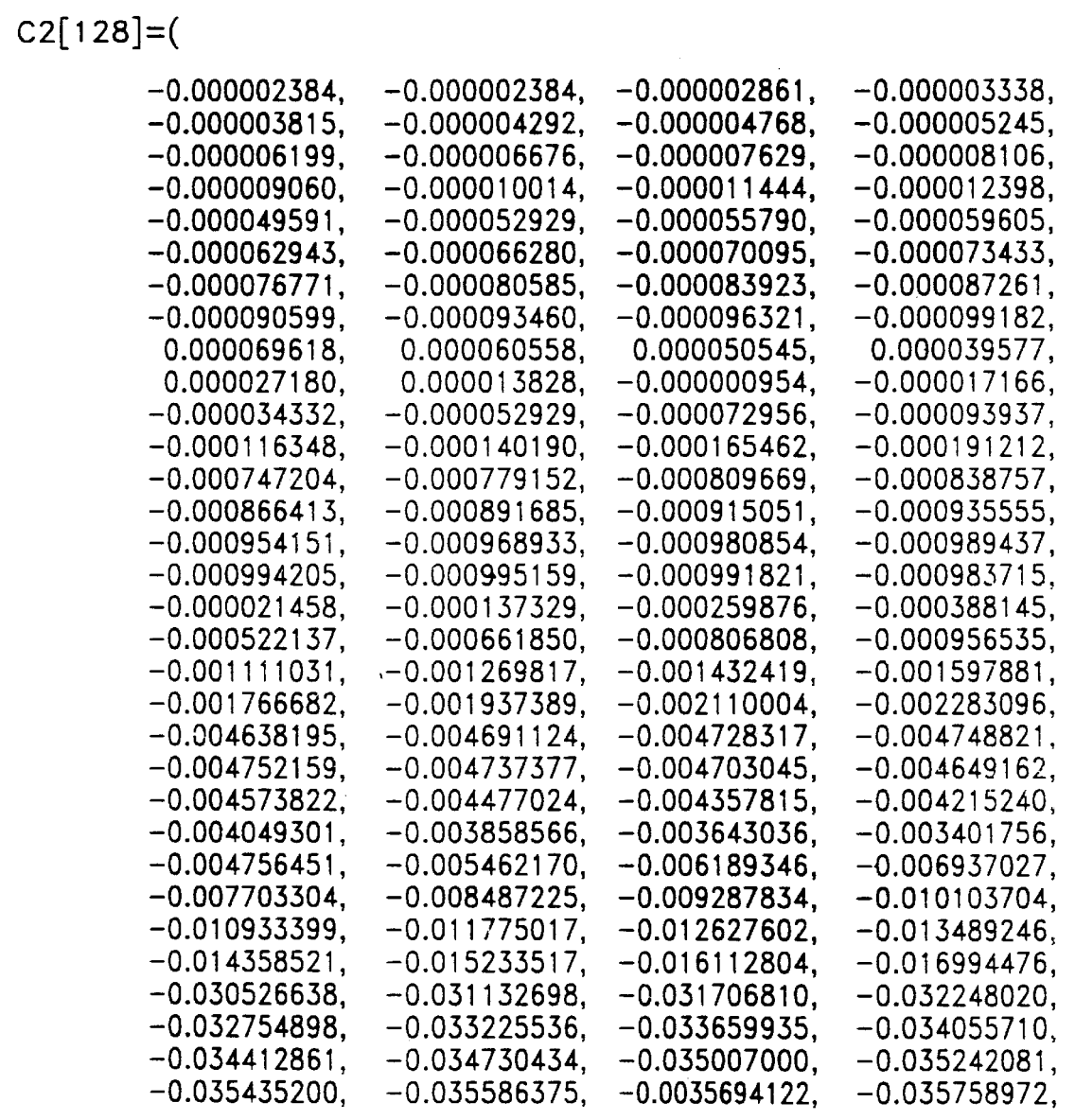

To decrease window multiplications, the window coefficients defined in the fast analysis filtering algorithm and used in FIG. 10 are calculated by equations (53), (54), and (55) as shown in FIG. 12. The window coefficients used in FIG. 11 may be calculated by equations (60), (61), and (62), and the calculated values are shown in FIG. 13.

As described above, the audio encoder and decoder having the high-speed analysis and synthesis filtering algorithms, respectively, according to the present invention exhibit the advantages: (1) operations in a band filter can be performed at a high speed by reducing operations of the band filter used for MPEG IS 11172-3; (2) storage space for window coefficients can be saved utilizing the symmetry of window coefficients in realizing a high-speed band filter; (3) when hardware for only MPEG audio is achieved by using the high-speed filtering algorithm, a slower processor can be used and thus the exclusive-use hardware becomes inexpensive; and (4) a real-time MPEG audio decoder can be realized in a general-purpose processor by using the fast filtering algorithm.

What is claimed is:

1. An audio encoder/decoder comprising:

a mapping unit for classifying a received audio signal according to a frequency band using a high-speed band analysis filtering algorithm, wherein said mapping unit performs a discrete cosine transform (DCT) by separating a signal obtained by multiplying window coefficients and the received audio signal into polyphase components, using the following equations:

$$X_m(k) = \sum_{p=0}^{M-1} u[p]\cos\left[v\left(k+\frac{1}{2}\right)\frac{\pi}{m}\right], \text{ wherein}$$

$$u[p] = \sum_{r=0}^{K-1} x_m\left[\left(2r+\frac{1}{2}\right)M\right]C\left[\left(2r+\frac{1}{2}\right)M\right], \text{ if } p=0,$$

$$u[p] = \sum_{r=0}^{K-1}\left\{x_m\left[\left(2r+\frac{1}{2}\right)M-p\right]C\left[\left(2r+\frac{1}{2}\right)M-p\right] + x_m\left[\left(2r+\frac{1}{2}\right)M+p\right]C\left[\left(2r+\frac{1}{2}\right)M+p\right]\right\}, \text{ if } 0 < p < \frac{M}{2},$$

$$u[p] = \sum_{r=0}^{K-1}\left\{-x_m\left[\left(2r+\frac{5}{2}\right)M-p\right]C\left[\left(2r+\frac{5}{2}\right)M-p\right] + x_m\left[\left(2r+\frac{1}{2}\right)M+p\right]C\left[\left(2r+\frac{1}{2}\right)M+p\right]\right\}, \text{ if } \frac{M}{2} < p < M,$$

and

-continued
$$u[p] = \sum_{r=0}^{K-1} \{x_m[2rM]C[2rM] + x_m[2rM + M]C[2rM + M]\}, \text{ if } p = \frac{M}{2},$$

wherein the input audio signal is divided into m blocks, m is a block number, $X_m[k]$ is a signal of a kth frequency band transformed from the mth block of the input audio signal, k is a frequency band number, K is a constant proportional to a relationship between a window size of an analysis window and a size of one of the k frequency bands, M is a number indicative of the size of a divided frequency band of the k frequency bands, $x_m[k]$ is an mth signal block obtained by formatting the received audio signal into blocks, C[ ] is a filter coefficient defined by $C[2pM+n]=(-1)^p 1/M\ h[2pM+n]$, wherein h[ ] is a coefficient of an analysis window, r is a number ranging from zero to K−1, p is a number ranging from zero to M−1, and v is a number, where v=p−1;

- a psychoacoustic model for assigning bits to each frequency band using psychoacoustic characteristics;
- a quantizing and encoding unit for quantizing and encoding the classified signal according to the number of bits assigned to each frequency band;
- a frame packing unit for generating a bit stream from the encoded classified signal output from said quantizing and encoding unit;
- a frame unpacking unit for unpacking the bit stream;
- a decoding and inverse-quantizing unit for decoding and inverse-quantizing the unpacked bit stream; and
- an inverse-mapping unit for time/frequency-inverse-mapping the inverse-quantized signal using the high-speed band synthesis filtering algorithm.

2. An audio encoder/decoder comprising:
- a mapping unit for classifying a received audio signal according to a frequency band using a high-speed band analysis filtering algorithm, wherein said mapping unit performs a discrete cosine transform by separating a signal obtained by multiplying window coefficients and the received audio signal into polyphase components, using the following equations:

$$X_m(k) = \sum_{p=0}^{M-1} u[p]\cos\left[p\left(k + \frac{1}{2}\right)\frac{\pi}{m}\right], \text{ wherein}$$

$$u[p] = UM_{m-0}[p], \text{ if } 0 \leq p < \frac{M}{2},$$

$$u[p] = UM_{m-0}[p] + z^{-M}\left\{UM_{m-1}\left[p - \frac{M}{2}\right]\right\}, \text{ if } p = \frac{M}{2}, \text{ and}$$

$$u[p] = z^{-M}\left\{UM_{m-1}\left[p - \frac{M}{2}\right]\right\}, \text{ if } \frac{M}{2} < p < M,$$

wherein $UM_{m-2s-1}[p]$ is a function defined as follows:

$$UM_{m-2s-1}[p] = \sum_{r=s}^{K-1} x_{m-2r}[0]C[2rM + M], \text{ if } p = 0, \text{ and}$$

$$UM_{m-2s-1}[p] = \sum_{r=s}^{K-1} \{-x_{m-2r}[M-p]C[(2r+2)M-p] +$$

$$x_{m-2r}[p]C[(2r+1)M+p]\}, \text{ if } 0 < p < \frac{M}{2},$$

and $UM_{m-2s}[p]$ is a function defined as follows:

$$UM_{m-2s}[p] = \sum_{r=s}^{K-1} x_{m-2r}\left[\frac{M}{2}\right]C\left[\left(2r + \frac{1}{2}\right)M\right], \text{ if } p = 0,$$

$$UM_{m-2s}[p] = \sum_{r=s}^{K-1} \left\{-x_{m-2r}\left[\frac{M}{2} - p\right]C\left[\left(2r + \frac{1}{2}\right)M - p\right] + x_{m-2r}\left[\frac{M}{2} + p\right]C\left[\left(2r + \frac{1}{2}\right)M + p\right]\right\}, \text{ if } 0 < p < \frac{M}{2}, \text{ and}$$

$$UM_{m-2s}[p] = \sum_{r=s}^{K-1} x_{m-2r}[0]C[2rM], \text{ if } p = \frac{M}{2},$$

wherein the input audio signal is divided into m blocks, m is a block number, $z^M\{\ \}$ is a time delay operator, $X_m[k]$ is a signal of a kth frequency band transformed from the mth block of the input audio signal, k is a frequency band number, K is a constant proportional to a relationship between a window size of an analysis window and a size of one of the k frequency bands, M is a number indicative of the size of a divided frequency band of the k frequency bands, $x_m[k]$ is an mth signal block obtained by formatting the received audio signal into blocks, C[ ] is a filter coefficient defined by $C[2pM+n]=(-1)^p 1/M\ h[2pM+n]$, wherein h[ ] is a coefficient of an analysis window, r is a number ranging from zero to K−1, p is a number ranging from zero to M−1, and s is a number ranging from zero to K−1;

- a psychoacoustic model for assigning bits to each frequency band using psychoacoustic characteristics;
- a quantizing and encoding unit for quantizing and encoding the classified signal according to the number of bits assigned to each frequency band;
- a frame packing unit for generating a bit stream from the encoded classified signal output from said quantizing and encoding unit;
- a frame unpacking unit for unpacking the bit stream;
- a decoding and inverse-quantizing unit for decoding and inverse-quantizing the unpacked bit stream; and
- an inverse-mapping unit for time/frequency-inverse-mapping the inverse-quantized signal using the high-speed band synthesis filtering algorithm.

3. The audio encoder/decoder as claimed in claim 1, wherein said mapping unit performs a discrete cosine transform by separating a signal obtained by multiplying window coefficients and the received audio signal into polyphase components, using the symmetry of the window coefficients.

4. An audio encoder/decoder comprising:
- a mapping unit for classifying a received audio signal according to a frequency band using a high-speed band analysis filtering algorithm;
- a psychoacoustic model for assigning bits to each frequency band using psychoacoustic characteristics;
- a quantizing and encoding unit for quantizing and encoding the classified signal according to the number of bits assigned to each frequency band;
- a frame packing unit for generating a bit stream from the encoded classified signal output from said quantizing and encoding unit;
- a frame unpacking unit for unpacking the bit stream;
- a decoding and inverse-quantizing unit for decoding and inverse-quantizing the unpacked bit stream; and
- an inverse-mapping unit for time/frequency-inverse-mapping the inverse-quantized signal using the high-speed band synthesis filtering algorithm, wherein said inverse-mapping unit performs a discrete cosine transform of signals, synthesis-windows the transformed signals, adds polyphase components of the windowed signals, and outputs a reconstructed signal, using the following equations:

$$xr_m[n] = \sum_{p=0}^{K-1} \left\{ z_{m-2p}\left[n+\frac{M}{2}\right] D[2pM+n] - z_{m-2p-1}\left[\frac{M}{2}-n\right] D[2pM+M+n] \right\}, \text{ if } 0 \leq n < \frac{M}{2},$$

$$xr_m[n] = \sum_{p=0}^{K-1} z_{m-2p-1}\left[\frac{M}{2}-n\right] D[2pM+M+n], \text{ if } n=\frac{M}{2}, \text{ and}$$

$$xr_m[n] = \sum_{p=0}^{K-1} \left\{ z_{m-2p}\left[\frac{3M}{2}-n\right] D[2pM+n] + z_{m-2p-1}\left[n-\frac{M}{2}\right] D[2pM+M+n] \right\}, \text{ if } \frac{M}{2} < n < M,$$

wherein D[ ] is a function defined as follows:

$$D[2pM+n]=(-1)^p f[2pM+n], \ 0 \leq p < M, \ 0 \leq n < 2M$$

f[ ] is a synthesizing window coefficient, K is a constant proportional to a relationship between a window size and the size of the divided frequency bands, M is a number indicative of the size of a divided frequency band, k is a frequency band number, m is a block number of each block of an input signal before encoding, p is a number ranging from zero to K−1, $z_m$[ ] is a function defined as follows:

$$z_m[n] = \sum_{l=0}^{M-1} XQ_m[l] \cos\left[n\left(l+\frac{1}{2}\right)\frac{\pi}{M}\right],$$

wherein $XQ_m$[l] is a signal including quantization noise generated in quantization and inverse quantization of an mth block signal $x_m$[k] obtained by formatting an input signal into blocks, l is a number ranging from zero to M−1, and n is a number ranging from zero to less than 2M.

5. The audio encoder/decoder as claimed in claim 4, wherein said inverse-mapping unit performs a discrete cosine transform of input signals, synthesis-windows the transformed signals, adds polyphase components of the windowed signals, and outputs a reconstructed signal, using the symmetry of the window coefficients.

6. An audio encoder/decoder comprising:
a mapping unit for classifying a received audio signal according to a frequency band using a high-speed band analysis filtering algorithm;
a psychoacoustic model for assigning bits to each frequency band using psychoacoustic characteristics;
a quantizing and encoding unit for quantizing and encoding the classified signal according to the number of bits assigned to each frequency band;
a frame packing unit for generating a bit stream from the encoded classified signal output from said quantizing and encoding unit;
a frame unpacking unit for unpacking the bit stream;
a decoding and inverse-quantizing unit for decoding and inverse-quantizing the unpacked bit stream; and
an inverse-mapping unit for time/frequency-inverse-mapping the inverse-quantized signal using the high-speed band synthesis filtering algorithm, wherein said inverse-mapping unit performs a discrete cosine transform of signals, synthesis-windows the transformed signals, adds polyphase components of the windowed signals, and outputs a reconstructed signal, using the following equations:

$$xbuf_{m-2s}[n] = z^{-2M}\{xbuf_{m-2s-2}[n]\} + z_m\left[n+\frac{M}{2}\right] D[2sM+n] - z_{m-1}\left[\frac{M}{2}-n\right] D[2sM+M+n], \text{ if } 0 \leq n < \frac{M}{2},$$

$$xbuf_{m-2s}[n] = z^{-2M}\{xbuf_{m-2s-2}[n]\} - z_{m-1}\left[\frac{M}{2}-n\right] D[2sM+M+n], \text{ if } n=\frac{M}{2}, \text{ and}$$

$$xbuf_{m-2s}[n] = z^{-2M}\{xbuf_{m-2s-2}[n]\} - z_m\left[\frac{3M}{2}-n\right] D[2sM+n] - z_{m-1}\left[\frac{M}{2}-n\right] D[2sM+M+n], \text{ if } \frac{M}{2} < n < M,$$

wherein $xbuf_{m-2s}$[n] is a function defined as follows:

$$xbuf_{m-2s}[n] = \sum_{p=s}^{K-1} \left\{ z_{m-2p}\left[n+\frac{M}{2}\right] D[2pM+n] - z_{m-2p-1}\left[\frac{M}{2}-n\right] D[2pM+M+n] \right\}, \text{ if } 0 \leq n < \frac{M}{2},$$

$$xbuf_{m-2s}[n] = -\sum_{p=s}^{K-1} z_{m-2p-1}\left[\frac{M}{2}-n\right] D[2pM+M+n], \text{ if } n=\frac{M}{2}, \text{ and}$$

$$xbuf_{m-2s}[n] = -\sum_{p=s}^{K-1} \left\{ z_{m-2p}\left[3\frac{M}{2}-n\right] D[2pM+n] + z_{m-2p-1}\left[n-\frac{M}{2}\right] D[2pM+M+n] \right\}, \text{ if } \frac{M}{2} < n < M,$$

wherein D[ ] is a function defined as follows:

$$D[2pM+n]=(-1)^p f[2pM+n], \ 0 \leq p < M, \ 0 \leq n < 2M$$

f[ ] is a synthesizing window coefficient, K is a constant proportional to a relationship between a window size and the size of the divided frequency bands, M is a number indicative of the size of a divided frequency band, k is a number indicative of the number of frequency bands, m is a block number of each block of an input signal before encoding, p is a number ranging from zero to M, $z_m$[ ] is a function defined as follows:

$$z_m[n] = \sum_{l=0}^{M-1} XQ_m[l] \cos\left[n\left(l+\frac{1}{2}\right)\frac{\pi}{M}\right],$$

wherein $XQ_m$[l] is a signal including quantization noise generated in quantization and inverse quantization of an mth block signal $x_m$[k] obtained by formatting an input signal into blocks, l is a number ranging from zero to M−1, s is a number ranging from zero to K−1, and n is a number ranging from zero to less than 2M.

* * * * *